US012300878B2

(12) United States Patent
Kuonanoja

(10) Patent No.: US 12,300,878 B2
(45) Date of Patent: May 13, 2025

(54) SLOT ANTENNA IN A WEARABLE DEVICE

(71) Applicant: Oura Health Oy, Oulu (FI)

(72) Inventor: Reetta Kuonanoja, Oulu (FI)

(73) Assignee: Oura Health Oy, Oulu (FI)

( * ) Notice: Subject to any disclaimer, the term of this patent is extended or adjusted under 35 U.S.C. 154(b) by 101 days.

(21) Appl. No.: 17/903,556

(22) Filed: Sep. 6, 2022

(65) Prior Publication Data

US 2024/0079763 A1 Mar. 7, 2024

(51) Int. Cl.

| | |
|---|---|
| ***H01Q 1/27*** | (2006.01) |
| ***G04G 21/04*** | (2013.01) |
| ***H01Q 1/24*** | (2006.01) |
| ***H01Q 13/10*** | (2006.01) |
| ***H01Q 21/06*** | (2006.01) |

(52) U.S. Cl.

CPC ............. *H01Q 1/273* (2013.01); *G04G 21/04* (2013.01); *H01Q 1/24* (2013.01); *H01Q 13/106* (2013.01); *H01Q 21/06* (2013.01)

(58) Field of Classification Search

CPC ........ H01Q 1/273; H01Q 1/24; H01Q 13/106; H01Q 21/06; H01Q 13/10; G04G 21/04

See application file for complete search history.

(56) References Cited

U.S. PATENT DOCUMENTS 4,208,660 A * 6/1980 McOwen, Jr. ...... H01Q 21/0075 343/789
5,714,961 A * 2/1998 Kot ........................ H01Q 13/18 343/769
5,757,326 A * 5/1998 Koyama .................. H01Q 1/22 343/702
5,917,454 A * 6/1999 Hill ........................ H01Q 13/12 343/769
6,288,685 B1 * 9/2001 Thomas ................. H01Q 13/10 343/897
9,697,459 B2 * 7/2017 Finn ......................... H01Q 7/00
10,367,251 B2 * 7/2019 Hwang .................. H01Q 13/18
10,498,041 B1 * 12/2019 Lin ........................ H01Q 13/16
10,637,148 B1 * 4/2020 Channabasappa ....... H01Q 5/40
11,968,502 B2 * 4/2024 Bern .................... A61N 1/0563
2004/0222930 A1 * 11/2004 Sun ........................ G04G 21/04 343/718
2007/0091004 A1 * 4/2007 Puuri ..................... H01Q 13/10 343/718
2008/0231522 A1 * 9/2008 Montgomery ....... H01Q 1/2258 343/702
2010/0217252 A1 * 8/2010 Rossetto ............ A61B 18/1815 606/33
2011/0155814 A1 * 6/2011 Kai ...................... G06K 19/041 235/492

(Continued)

FOREIGN PATENT DOCUMENTS

CN 202282452 U * 6/2012
CN 106654552 A * 5/2017

(Continued)

*Primary Examiner* — Hai V Tran
*Assistant Examiner* — Jordan E. DeWitt
(74) *Attorney, Agent, or Firm* — Holland & Hart LLP

(57) ABSTRACT

Methods, systems, and devices for operating a wearable device are described. A wearable device may include one or more slot antennas configured to transmit and receive electromagnetic fields for wireless communications.

19 Claims, 7 Drawing Sheets

(56) References Cited

U.S. PATENT DOCUMENTS

| | | | | |
|---|---|---|---|---|
| 2011/0234461 | A1* | 9/2011 | Grange | H01Q 1/273 343/702 |
| 2011/0241948 | A1* | 10/2011 | Bevelacqua | H01Q 13/18 343/702 |
| 2014/0071009 | A1* | 3/2014 | Cheng | H01Q 5/378 343/770 |
| 2014/0266920 | A1* | 9/2014 | Tran | H01Q 1/243 343/702 |
| 2014/0266921 | A1* | 9/2014 | Joshi | A61N 1/37229 343/702 |
| 2015/0091761 | A1* | 4/2015 | van Niekerk | H01Q 1/48 343/702 |
| 2015/0349410 | A1* | 12/2015 | Russell | G04G 21/04 29/601 |
| 2016/0006109 | A1* | 1/2016 | Apaydin | H01Q 13/18 343/702 |
| 2016/0308272 | A1* | 10/2016 | Standke | H01Q 9/145 |
| 2016/0322699 | A1* | 11/2016 | Mow | H01Q 13/10 |
| 2017/0214120 | A1* | 7/2017 | Lee | H01Q 1/523 |
| 2017/0339772 | A1* | 11/2017 | Ozaki | H05B 45/3725 |
| 2018/0041617 | A1* | 2/2018 | Shamsoddini | H01Q 1/38 |
| 2018/0083342 | A1* | 3/2018 | Lepe | H01Q 1/243 |
| 2018/0102588 | A1* | 4/2018 | Szini | H01Q 1/241 |
| 2018/0151952 | A1* | 5/2018 | Oh | H01Q 9/42 |
| 2018/0242436 | A1* | 8/2018 | Ozaki | H01Q 9/42 |
| 2018/0287248 | A1* | 10/2018 | Han | H01Q 1/48 |
| 2019/0006742 | A1* | 1/2019 | McLear | A44C 9/02 |
| 2019/0058256 | A1* | 2/2019 | Sepänniitty | H01Q 9/0421 |
| 2019/0229395 | A1* | 7/2019 | Hintermann | H01Q 1/22 |
| 2019/0245272 | A1* | 8/2019 | Varjonen | G01S 19/13 |
| 2019/0379122 | A1* | 12/2019 | Kenkel | G06F 1/1698 |
| 2019/0387848 | A1* | 12/2019 | Leybourn | H04B 5/26 |
| 2020/0194905 | A1* | 6/2020 | Wei | A61B 5/0006 |
| 2020/0266529 | A1* | 8/2020 | Moussakhani | H01Q 13/106 |
| 2020/0365974 | A1* | 11/2020 | Wei | H01Q 9/42 |
| 2021/0075116 | A1* | 3/2021 | Chen | H05K 1/0216 |
| 2021/0091459 | A1* | 3/2021 | Jian | H01Q 13/106 |
| 2021/0099203 | A1* | 4/2021 | Hiemstra | H02J 50/10 |
| 2022/0019993 | A1* | 1/2022 | Rezayee | G06K 19/0712 |
| 2023/0008815 | A1* | 1/2023 | Zhao | H01Q 5/321 |
| 2023/0008911 | A1* | 1/2023 | Rossi | H01Q 1/526 |
| 2023/0022192 | A1* | 1/2023 | Zhao | H01Q 13/103 |
| 2023/0170620 | A1* | 6/2023 | Zhao | H01Q 7/00 343/702 |
| 2023/0187822 | A1* | 6/2023 | Sayem | H01Q 1/44 343/720 |
| 2023/0277056 | A1* | 9/2023 | Kuonanoja | H01Q 1/273 343/702 |
| 2024/0079763 | A1* | 3/2024 | Kuonanoja | H01Q 21/06 |

FOREIGN PATENT DOCUMENTS

| | | | | | |
|---|---|---|---|---|---|
| CN | 109417218 | A | * | 3/2019 | A44C 9/0053 |
| CN | 110444895 | A | * | 11/2019 | |
| CN | 112909562 | A | * | 6/2021 | H01Q 1/273 |
| CN | 213816432 | U | * | 7/2021 | |
| JP | 2014007743 | A | * | 1/2014 | H01Q 1/273 |
| JP | 2022076554 | A | * | 5/2022 | |
| RU | 2739868 | C1 | * | 12/2020 | H01Q 13/00 |
| WO | WO-2012071968 | A1 | * | 6/2012 | H01Q 1/243 |
| WO | WO-2021087899 | A1 | * | 5/2021 | H01Q 1/38 |
| WO | WO-2021204138 | A1 | * | 10/2021 | |

* cited by examiner

SLOT ANTENNA IN A WEARABLE DEVICE

FIELD OF TECHNOLOGY

The following relates to wearable devices and data processing, including a slot antenna in a wearable device.

BACKGROUND

Some wearable devices may be configured with sensors to collect data, such as physiological data, from users. Such a wearable device may use an antenna to communicate the collected data, or other information, to another device, such as a user device. But the configuration of the wearable device may limit or reduce the performance of the antenna. Accordingly, improved designs for an antenna in a wearable device may be desired.

DETAILED DESCRIPTION

A wearable device, such as a wearable ring device, may use an antenna to wirelessly communicate with another device, such as a user device. For example, the wearable device may use the antenna to exchange information, such as physiological data collected by the wearable device, with the user device. In some wearable devices, the antenna may be disposed within the wearable device. But the performance of an antenna disposed within a wearable device may be limited by the size of the wearable device and may suffer based on the material(s) used to form the wearable device. For example, use of a conductive (e.g., metal) material to form the exterior surfaces of the wearable device may result a Faraday cage that attenuates or blocks electromagnetic fields, thus impairing antenna performance and the communication ability of the wearable device.

According to the designs described herein, the antenna performance of a wearable device may be improved, relative to other designs, by placing one or more slots in the conductive exterior surface(s) of the wearable device to function as slot antennas. Because the slot antennas are formed from the conductive exterior surface(s) of the wearable device, the Faraday cage formed by the conductive exterior surfaces is unable to affect the electromagnetic fields generated by the slot antennas. So, the communication ability of the wearable device may be improved relative to other designs.

Aspects of the disclosure are initially described in the context of systems supporting physiological data collection from users via wearable devices. Additional features of the disclosure are described in the context of a wearable device. Aspects of the disclosure are further illustrated by and described with reference to a system diagram that relates to a slot antenna in a wearable device.

Figure 1:
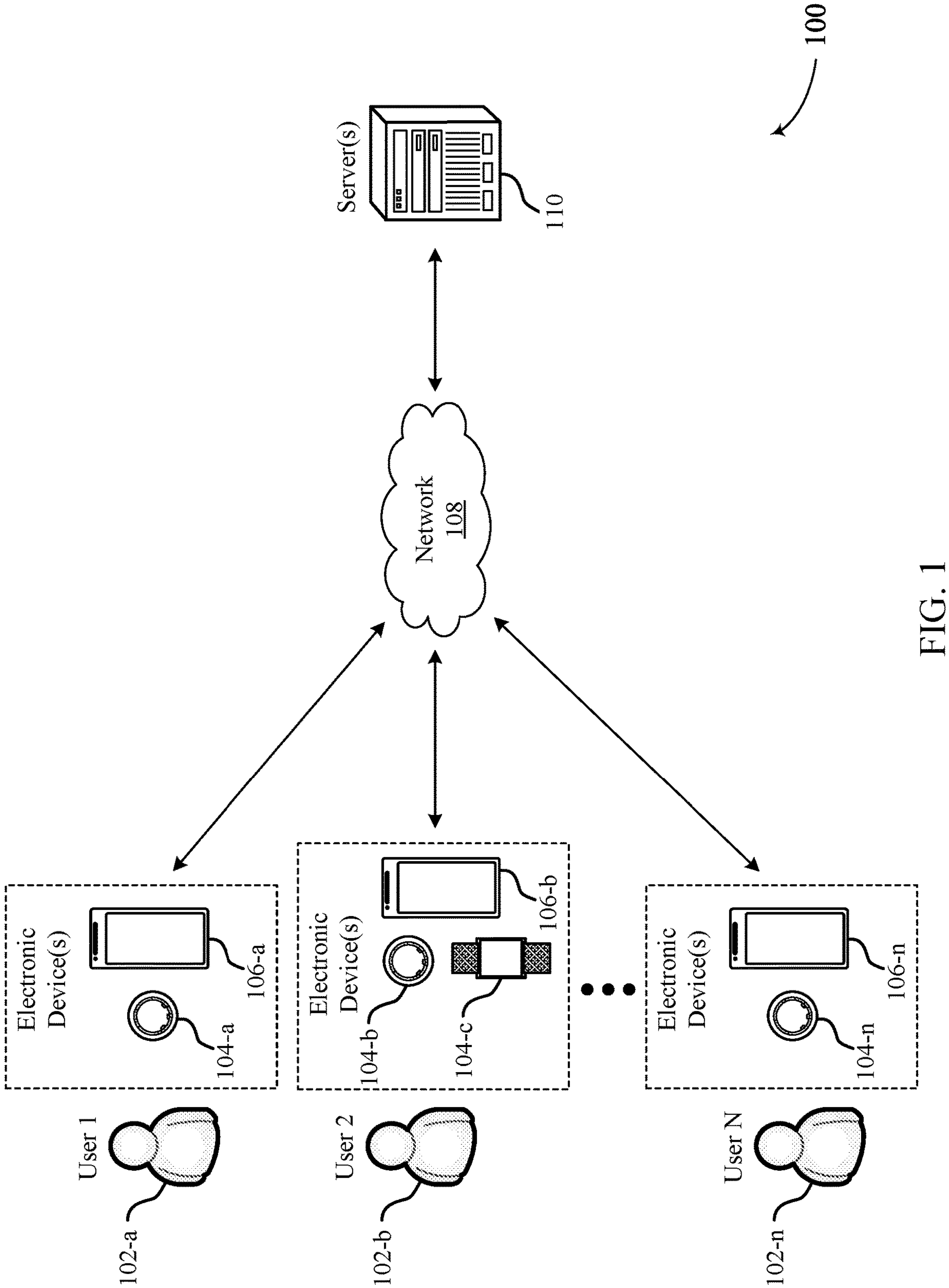
FIG. 1 illustrates an example of a system that supports a slot antenna in a wearable device in accordance with aspects of the present disclosure.

FIG. 1 illustrates an example of a system 100 that supports slot antenna in a wearable device in accordance with aspects of the present disclosure. The system 100 includes a plurality of electronic devices (e.g., wearable devices 104, user devices 106) that may be worn and/or operated by one or more users 102. The system 100 further includes a network 108 and one or more servers 110.

The electronic devices may include any electronic devices known in the art, including wearable devices 104 (e.g., ring wearable devices, watch wearable devices, etc.), user devices 106 (e.g., smartphones, laptops, tablets). The electronic devices associated with the respective users 102 may include one or more of the following functionalities: 1) measuring physiological data, 2) storing the measured data, 3) processing the data, 4) providing outputs (e.g., via GUIs) to a user 102 based on the processed data, and 5) communicating data with one another and/or other computing devices. Different electronic devices may perform one or more of the functionalities.

Example wearable devices 104 may include wearable computing devices, such as a ring computing device (hereinafter "ring") configured to be worn on a user's 102 finger, a wrist computing device (e.g., a smart watch, fitness band, or bracelet) configured to be worn on a user's 102 wrist, and/or a head mounted computing device (e.g., glasses/goggles). Wearable devices 104 may also include bands, straps (e.g., flexible or inflexible bands or straps), stick-on sensors, and the like, that may be positioned in other locations, such as bands around the head (e.g., a forehead headband), arm (e.g., a forearm band and/or bicep band), and/or leg (e.g., a thigh or calf band), behind the ear, under the armpit, and the like. Wearable devices 104 may also be attached to, or included in, articles of clothing. For example, wearable devices 104 may be included in pockets and/or pouches on clothing. As another example, wearable device 104 may be clipped and/or pinned to clothing, or may otherwise be maintained within the vicinity of the user 102. Example articles of clothing may include, but are not limited to, hats, shirts, gloves, pants, socks, outerwear (e.g., jackets), and undergarments. In some implementations, wearable devices 104 may be included with other types of devices such as training/sporting devices that are used during physical activity. For example, wearable devices 104 may be attached to, or included in, a bicycle, skis, a tennis racket, a golf club, and/or training weights.

Much of the present disclosure may be described in the context of a ring wearable device 104. Accordingly, the terms "ring 104," "wearable device 104," and like terms, may be used interchangeably, unless noted otherwise herein. However, the use of the term "ring 104" is not to be regarded as limiting, as it is contemplated herein that aspects of the present disclosure may be performed using other wearable devices (e.g., watch wearable devices, necklace wearable device, bracelet wearable devices, earring wearable devices, anklet wearable devices, and the like).

In some aspects, user devices 106 may include handheld mobile computing devices, such as smartphones and tablet computing devices. User devices 106 may also include personal computers, such as laptop and desktop computing devices. Other example user devices 106 may include server computing devices that may communicate with other electronic devices (e.g., via the Internet). In some implementations, computing devices may include medical devices, such as external wearable computing devices (e.g., Holter monitors). Medical devices may also include implantable medical devices, such as pacemakers and cardioverter defibrillators. Other example user devices 106 may include home computing devices, such as internet of things (IoT) devices. Examples of IoT devices include smart televisions, smart speakers, smart displays (e.g., video call displays), hubs (e.g., wireless communication hubs), security systems, smart appliances (e.g., thermostats and refrigerators), and fitness equipment.

Some electronic devices (e.g., wearable devices 104, user devices 106) may measure physiological parameters of respective users 102, such as photoplethysmography waveforms, continuous skin temperature, a pulse waveform, respiration rate, heart rate, heart rate variability (HRV), actigraphy, galvanic skin response, pulse oximetry, and/or other physiological parameters. Some electronic devices that measure physiological parameters may also perform some/all of the calculations described herein. Some electronic devices may not measure physiological parameters, but may perform some/all of the calculations described herein. For example, a ring (e.g., wearable device 104), mobile device application, or a server computing device may process received physiological data that was measured by other devices.

In some implementations, a user 102 may operate, or may be associated with, multiple electronic devices, some of which may measure physiological parameters and some of which may process the measured physiological parameters. In some implementations, a user 102 may have a ring (e.g., wearable device 104) that measures physiological parameters. The user 102 may also have, or be associated with, a user device 106 (e.g., mobile device, smartphone), where the wearable device 104 and the user device 106 are communicatively coupled to one another. In some cases, the user device 106 may receive data from the wearable device 104 and perform some/all of the calculations described herein. In some implementations, the user device 106 may also measure physiological parameters described herein, such as motion/activity parameters.

For example, as illustrated in FIG. 1, a first user 102-*a* (User 1) may operate, or may be associated with, a wearable device 104-*a* (e.g., ring 104-*a*) and a user device 106-*a* that may operate as described herein. In this example, the user device 106-*a* associated with user 102-*a* may process/store physiological parameters measured by the ring 104-*a*. Comparatively, a second user 102-*b* (User 2) may be associated with a ring 104-*b*, a watch wearable device 104-*c* (e.g., watch 104-*c*), and a user device 106-*b*, where the user device 106-*b* associated with user 102-*b* may process/store physiological parameters measured by the ring 104-*b* and/or the watch 104-*c*. Moreover, an nth user 102-*n* (User N) may be associated with an arrangement of electronic devices described herein (e.g., ring 104-*n*, user device 106-*n*). In some aspects, wearable devices 104 (e.g., rings 104, watches 104) and other electronic devices may be communicatively coupled to the user devices 106 of the respective users 102 via Bluetooth, Wi-Fi, and other wireless protocols.

In some implementations, the rings 104 (e.g., wearable devices 104) of the system 100 may be configured to collect physiological data from the respective users 102 based on arterial blood flow within the user's finger. In particular, a ring 104 may utilize one or more LEDs (e.g., red LEDs, green LEDs) that emit light on the palm-side of a user's finger to collect physiological data based on arterial blood flow within the user's finger. In some cases, the system 100 may be configured to collect physiological data from the respective users 102 based on blood flow diffused into a microvascular bed of skin with capillaries and arterioles. For example, the system 100 may collect PPG data based on a measured amount of blood diffused into the microvascular system of capillaries and arterioles. In some implementations, the ring 104 may acquire the physiological data using a combination of both green and red LEDs. The physiological data may include any physiological data known in the art including, but not limited to, temperature data, accelerometer data (e.g., movement/motion data), heart rate data, HRV data, blood oxygen level data, or any combination thereof.

The use of both green and red LEDs may provide several advantages over other solutions, as red and green LEDs have been found to have their own distinct advantages when acquiring physiological data under different conditions (e.g., light/dark, active/inactive) and via different parts of the body, and the like. For example, green LEDs have been found to exhibit better performance during exercise. Moreover, using multiple LEDs (e.g., green and red LEDs) distributed around the ring 104 has been found to exhibit superior performance as compared to wearable devices that utilize LEDs that are positioned close to one another, such as within a watch wearable device. Furthermore, the blood vessels in the finger (e.g., arteries, capillaries) are more accessible via LEDs as compared to blood vessels in the wrist. In particular, arteries in the wrist are positioned on the bottom of the wrist (e.g., palm-side of the wrist), meaning only capillaries are accessible on the top of the wrist (e.g., back of hand side of the wrist), where wearable watch devices and similar devices are typically worn. As such, utilizing LEDs and other sensors within a ring 104 has been found to exhibit superior performance as compared to wearable devices worn on the wrist, as the ring 104 may have greater access to arteries (as compared to capillaries), thereby resulting in stronger signals and more valuable physiological data.

The electronic devices of the system 100 (e.g., user devices 106, wearable devices 104) may be communicatively coupled to one or more servers 110 via wired or wireless communication protocols. For example, as shown in FIG. 1, the electronic devices (e.g., user devices 106) may be communicatively coupled to one or more servers 110 via a network 108. The network 108 may implement transfer control protocol and internet protocol (TCP/IP), such as the Internet, or may implement other network 108 protocols. Network connections between the network 108 and the respective electronic devices may facilitate transport of data via email, web, text messages, mail, or any other appropriate form of interaction within a computer network 108. For example, in some implementations, the ring 104-*a* associated with the first user 102-*a* may be communicatively coupled to the user device 106-*a*, where the user device 106-*a* is communicatively coupled to the servers 110 via the network 108. In additional or alternative cases, wearable devices 104 (e.g., rings 104, watches 104) may be directly communicatively coupled to the network 108.

The system 100 may offer an on-demand database service between the user devices 106 and the one or more servers 110. In some cases, the servers 110 may receive data from the user devices 106 via the network 108, and may store and analyze the data. Similarly, the servers 110 may provide data to the user devices 106 via the network 108. In some cases, the servers 110 may be located at one or more data centers. The servers 110 may be used for data storage, management, and processing. In some implementations, the servers 110 may provide a web-based interface to the user device 106 via web browsers.

In some aspects, the system 100 may detect periods of time that a user 102 is asleep, and classify periods of time that the user 102 is asleep into one or more sleep stages (e.g., sleep stage classification). For example, as shown in FIG. 1, User 102-*a* may be associated with a wearable device 104-*a* (e.g., ring 104-*a*) and a user device 106-*a*. In this example, the ring 104-*a* may collect physiological data associated with the user 102-*a*, including temperature, heart rate, HRV, respiratory rate, and the like. In some aspects, data collected by the ring 104-*a* may be input to a machine learning classifier, where the machine learning classifier is configured to determine periods of time that the user 102-*a* is (or was) asleep. Moreover, the machine learning classifier may be configured to classify periods of time into different sleep stages, including an awake sleep stage, a rapid eye movement (REM) sleep stage, a light sleep stage (non-REM (NREM)), and a deep sleep stage (NREM). In some aspects, the classified sleep stages may be displayed to the user 102-*a* via a GUI of the user device 106-*a*. Sleep stage classification may be used to provide feedback to a user 102-*a* regarding the user's sleeping patterns, such as recommended bedtimes, recommended wake-up times, and the like. Moreover, in some implementations, sleep stage classification techniques described herein may be used to calculate scores for the respective user, such as Sleep Scores, Readiness Scores, and the like.

In some aspects, the system 100 may utilize circadian rhythm-derived features to further improve physiological data collection, data processing procedures, and other techniques described herein. The term circadian rhythm may refer to a natural, internal process that regulates an individual's sleep-wake cycle, that repeats approximately every 24 hours. In this regard, techniques described herein may utilize circadian rhythm adjustment models to improve physiological data collection, analysis, and data processing. For example, a circadian rhythm adjustment model may be input into a machine learning classifier along with physiological data collected from the user 102-*a* via the wearable device 104-*a*. In this example, the circadian rhythm adjustment model may be configured to "weight," or adjust, physiological data collected throughout a user's natural, approximately 24-hour circadian rhythm. In some implementations, the system may initially start with a "baseline" circadian rhythm adjustment model, and may modify the baseline model using physiological data collected from each user 102 to generate tailored, individualized circadian rhythm adjustment models that are specific to each respective user 102.

In some aspects, the system 100 may utilize other biological rhythms to further improve physiological data collection, analysis, and processing by phase of these other rhythms. For example, if a weekly rhythm is detected within an individual's baseline data, then the model may be configured to adjust "weights" of data by day of the week. Biological rhythms that may require adjustment to the model by this method include: 1) ultradian (faster than a day rhythms, including sleep cycles in a sleep state, and oscillations from less than an hour to several hours periodicity in the measured physiological variables during wake state; 2) circadian rhythms; 3) non-endogenous daily rhythms shown to be imposed on top of circadian rhythms, as in work schedules; 4) weekly rhythms, or other artificial time periodicities exogenously imposed (e.g. in a hypothetical culture with 12 day "weeks", 12 day rhythms could be used); 5) multi-day ovarian rhythms in women and spermatogenesis rhythms in men; 6) lunar rhythms (relevant for individuals living with low or no artificial lights); and 7) seasonal rhythms.

The biological rhythms are not always stationary rhythms. For example, many women experience variability in ovarian cycle length across cycles, and ultradian rhythms are not expected to occur at exactly the same time or periodicity across days even within a user. As such, signal processing techniques sufficient to quantify the frequency composition while preserving temporal resolution of these rhythms in physiological data may be used to improve detection of these rhythms, to assign phase of each rhythm to each moment in time measured, and to thereby modify adjustment models and comparisons of time intervals. The biological rhythm-adjustment models and parameters can be added in linear or non-linear combinations as appropriate to more accurately capture the dynamic physiological baselines of an individual or group of individuals.

To facilitate wireless communications with a user device 106, a wearable device 104 may include an antenna. In some wearable devices, the antenna may be disposed within the wearable device. But disposition of an antenna within a wearable device 104 may be impracticable if the wearable device has conductive exterior surfaces that attenuate electromagnetic fields. An antenna design that works with conductive exterior surfaces (which may be associated with various performance and comfort benefits) may be desired.

According to the designs described herein, a wearable device 104 may include one or more slot antennas that allow the wearable device 104 to have conductive exterior surfaces without compromising antenna performance. For example, relative to other designs, the slot antenna designs described herein may increase (among other performance metrics) antenna efficiency and antenna range, where antenna efficiency refers to the ratio of the power delivered to the antenna relative to the power radiated by the antenna and antenna range refers to the distance at which data can be reliably received (e.g., received with a threshold error rate).

Although described with reference to a wearable device 104 that includes conductive exterior surfaces (e.g., exterior surfaces that consist of conductive material), the slot antenna designs described herein may be advantageous for other configurations of wearable devices 104. For example, use of a slot antenna may allow a wearable device 104 to omit an internal antenna, which in turn may free up space within the wearable device 104 for other components and/or enable scaling of the wearable device 104. So, use of slot antennas in a wearable device 104 that has one or more non-conductive exterior surfaces may be desirable. In such a wearable device 104, the slot antennas may be formed within one or more conductive bands of material that are on exterior surface(s) that are otherwise non-conductive (e.g., made of epoxy, polymer, ceramic, plastic).

It should be appreciated by a person skilled in the art that one or more aspects of the disclosure may be implemented in a system 100 to additionally or alternatively solve other problems than those described above. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
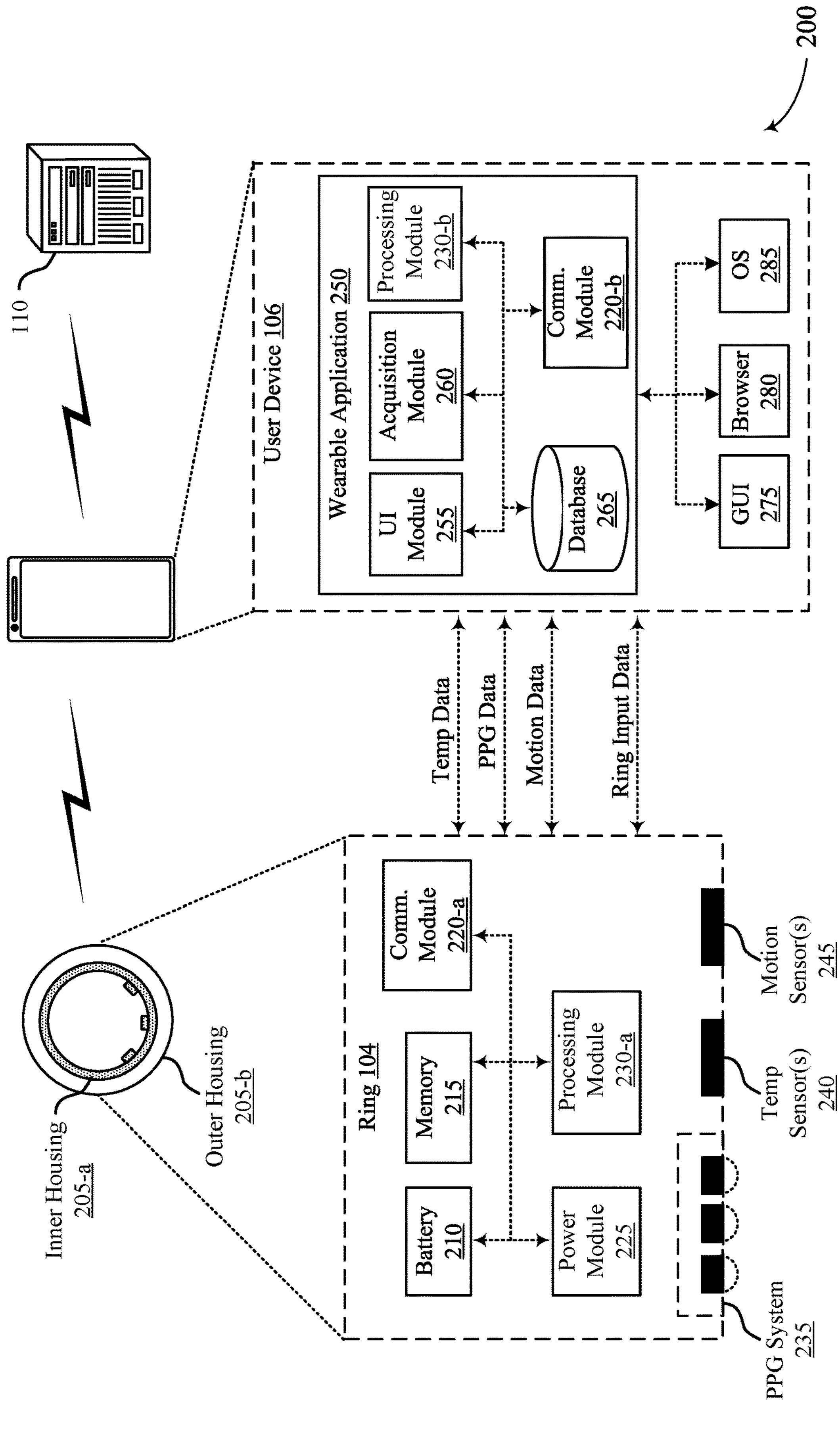
FIG. 2 illustrates an example of a system that supports a slot antenna in a wearable device in accordance with aspects of the present disclosure.

FIG. 2 illustrates an example of a system 200 that supports slot antenna in a wearable device in accordance with aspects of the present disclosure. The system 200 may implement, or be implemented by, system 100. In particular, system 200 illustrates an example of a ring 104 (e.g., wearable device 104), a user device 106, and a server 110, as described with reference to FIG. 1.

In some aspects, the ring 104 may be configured to be worn around a user's finger, and may determine one or more user physiological parameters when worn around the user's finger. Example measurements and determinations may include, but are not limited to, user skin temperature, pulse waveforms, respiratory rate, heart rate, HRV, blood oxygen levels, and the like.

The system 200 further includes a user device 106 (e.g., a smartphone) in communication with the ring 104. For example, the ring 104 may be in wireless and/or wired communication with the user device 106. In some implementations, the ring 104 may send measured and processed data (e.g., temperature data, photoplethysmogram (PPG) data, motion/accelerometer data, ring input data, and the like) to the user device 106. The user device 106 may also send data to the ring 104, such as ring 104 firmware/configuration updates. The user device 106 may process data. In some implementations, the user device 106 may transmit data to the server 110 for processing and/or storage.

The ring 104 may include a housing 205 that may include an inner housing 205-*a* and an outer housing 205-*b*. In some aspects, the housing 205 of the ring 104 may store or otherwise include various components of the ring including, but not limited to, device electronics, a power source (e.g., battery 210, and/or capacitor), one or more substrates (e.g., printable circuit boards) that interconnect the device electronics and/or power source, and the like. The device electronics may include device modules (e.g., hardware/software), such as: a processing module 230-*a*, a memory 215, a communication module 220-*a*, a power module 225, and the like. The device electronics may also include one or more sensors. Example sensors may include one or more temperature sensors 240, a PPG sensor assembly (e.g., PPG system 235), and one or more motion sensors 245.

The sensors may include associated modules (not illustrated) configured to communicate with the respective components/modules of the ring 104, and generate signals associated with the respective sensors. In some aspects, each of the components/modules of the ring 104 may be communicatively coupled to one another via wired or wireless connections. Moreover, the ring 104 may include additional and/or alternative sensors or other components that are configured to collect physiological data from the user, including light sensors (e.g., LEDs), oximeters, and the like.

The ring 104 shown and described with reference to FIG. 2 is provided solely for illustrative purposes. As such, the ring 104 may include additional or alternative components as those illustrated in FIG. 2. Other rings 104 that provide functionality described herein may be fabricated. For example, rings 104 with fewer components (e.g., sensors) may be fabricated. In a specific example, a ring 104 with a single temperature sensor 240 (or other sensor), a power source, and device electronics configured to read the single temperature sensor 240 (or other sensor) may be fabricated. In another specific example, a temperature sensor 240 (or other sensor) may be attached to a user's finger (e.g., using a clamps, spring loaded clamps, etc.). In this case, the sensor may be wired to another computing device, such as a wrist worn computing device that reads the temperature sensor 240 (or other sensor). In other examples, a ring 104 that includes additional sensors and processing functionality may be fabricated.

The housing 205 may include one or more housing 205 components. The housing 205 may include an outer housing 205-*b* component (e.g., a shell) and an inner housing 205-*a* component (e.g., a molding). The housing 205 may include additional components (e.g., additional layers) not explicitly illustrated in FIG. 2. For example, in some implementations, the ring 104 may include one or more insulating layers that electrically insulate the device electronics and other conductive materials (e.g., electrical traces) from the outer housing 205-*b* (e.g., a metal outer housing 205-*b*). The housing 205 may provide structural support for the device electronics, battery 210, substrate(s), and other components. For example, the housing 205 may protect the device electronics, battery 210, and substrate(s) from mechanical forces, such as pressure and impacts. The housing 205 may also protect the device electronics, battery 210, and substrate(s) from water and/or other chemicals.

The outer housing 205-*b* may be fabricated from one or more materials. In some implementations, the outer housing 205-*b* may include a metal, such as titanium, that may provide strength and abrasion resistance at a relatively light weight. The outer housing 205-*b* may also be fabricated from other materials, such polymers. In some implementations, the outer housing 205-*b* may be protective as well as decorative.

The inner housing 205-*a* may be configured to interface with the user's finger. The inner housing 205-*a* may be formed from a polymer (e.g., a medical grade polymer) or other material. In some implementations, the inner housing 205-*a* may be transparent. For example, the inner housing 205-*a* may be transparent to light emitted by the PPG light emitting diodes (LEDs). In some implementations, the inner housing 205-*a* component may be molded onto the outer housing 205-*a*. For example, the inner housing 205-*a* may include a polymer that is molded (e.g., injection molded) to fit into an outer housing 205-*b* metallic shell.

The ring 104 may include one or more substrates (not illustrated). The device electronics and battery 210 may be included on the one or more substrates. For example, the device electronics and battery 210 may be mounted on one or more substrates. Example substrates may include one or more printed circuit boards (PCBs), such as flexible PCB (e.g., polyimide). In some implementations, the electronics/battery 210 may include surface mounted devices (e.g., surface-mount technology (SMT) devices) on a flexible PCB. In some implementations, the one or more substrates (e.g., one or more flexible PCBs) may include electrical traces that provide electrical communication between device electronics. The electrical traces may also connect the battery 210 to the device electronics.

The device electronics, battery 210, and substrates may be arranged in the ring 104 in a variety of ways. In some implementations, one substrate that includes device electronics may be mounted along the bottom of the ring 104 (e.g., the bottom half), such that the sensors (e.g., PPG system 235, temperature sensors 240, motion sensors 245, and other sensors) interface with the underside of the user's finger. In these implementations, the battery 210 may be included along the top portion of the ring 104 (e.g., on another substrate).

The various components/modules of the ring 104 represent functionality (e.g., circuits and other components) that may be included in the ring 104. Modules may include any discrete and/or integrated electronic circuit components that implement analog and/or digital circuits capable of producing the functions attributed to the modules herein. For example, the modules may include analog circuits (e.g., amplification circuits, filtering circuits, analog/digital conversion circuits, and/or other signal conditioning circuits). The modules may also include digital circuits (e.g., combinational or sequential logic circuits, memory circuits etc.).

The memory 215 (memory module) of the ring 104 may include any volatile, non-volatile, magnetic, or electrical media, such as a random access memory (RAM), read-only memory (ROM), non-volatile RAM (NVRAM), electrically-erasable programmable ROM (EEPROM), flash memory, or any other memory device. The memory 215 may store any of the data described herein. For example, the memory 215 may be configured to store data (e.g., motion data, temperature data, PPG data) collected by the respective sensors and PPG system 235. Furthermore, memory 215 may include instructions that, when executed by one or more processing circuits, cause the modules to perform various functions attributed to the modules herein. The device electronics of the ring 104 described herein are only example device electronics. As such, the types of electronic components used to implement the device electronics may vary based on design considerations.

The functions attributed to the modules of the ring 104 described herein may be embodied as one or more processors, hardware, firmware, software, or any combination thereof. Depiction of different features as modules is intended to highlight different functional aspects and does not necessarily imply that such modules must be realized by separate hardware/software components. Rather, functionality associated with one or more modules may be performed by separate hardware/software components or integrated within common hardware/software components.

The processing module 230-*a* of the ring 104 may include one or more processors (e.g., processing units), microcontrollers, digital signal processors, systems on a chip (SOCs), and/or other processing devices. The processing module 230-*a* communicates with the modules included in the ring 104. For example, the processing module 230-*a* may transmit/receive data to/from the modules and other components of the ring 104, such as the sensors. As described herein, the modules may be implemented by various circuit components. Accordingly, the modules may also be referred to as circuits (e.g., a communication circuit and power circuit).

The processing module 230-*a* may communicate with the memory 215. The memory 215 may include computer-readable instructions that, when executed by the processing module 230-*a*, cause the processing module 230-*a* to perform the various functions attributed to the processing module 230-*a* herein. In some implementations, the processing module 230-*a* (e.g., a microcontroller) may include additional features associated with other modules, such as communication functionality provided by the communication module 220-*a* (e.g., an integrated Bluetooth Low Energy transceiver) and/or additional onboard memory 215.

The communication module 220-*a* may include circuits that provide wireless and/or wired communication with the user device 106 (e.g., communication module 220-*b* of the user device 106). In some implementations, the communication modules 220-*a*, 220-*b* may include wireless communication circuits, such as Bluetooth circuits and/or Wi-Fi circuits. In some implementations, the communication modules 220-*a*, 220-*b* can include wired communication circuits, such as Universal Serial Bus (USB) communication circuits. Using the communication module 220-*a*, the ring 104 and the user device 106 may be configured to communicate with each other. The processing module 230-*a* of the ring may be configured to transmit/receive data to/from the user device 106 via the communication module 220-*a*. Example data may include, but is not limited to, motion data, temperature data, pulse waveforms, heart rate data, HRV data, PPG data, and status updates (e.g., charging status, battery charge level, and/or ring 104 configuration settings). The processing module 230-*a* of the ring may also be configured to receive updates (e.g., software/firmware updates) and data from the user device 106.

The ring 104 may include a battery 210 (e.g., a rechargeable battery 210). An example battery 210 may include a Lithium-Ion or Lithium-Polymer type battery 210, although a variety of battery 210 options are possible. The battery 210 may be wirelessly charged. In some implementations, the ring 104 may include a power source other than the battery 210, such as a capacitor. The power source (e.g., battery 210 or capacitor) may have a curved geometry that matches the curve of the ring 104. In some aspects, a charger or other power source may include additional sensors that may be used to collect data in addition to, or that supplements, data collected by the ring 104 itself. Moreover, a charger or other power source for the ring 104 may function as a user device 106, in which case the charger or other power source for the ring 104 may be configured to receive data from the ring 104, store and/or process data received from the ring 104, and communicate data between the ring 104 and the servers 110.

In some aspects, the ring 104 includes a power module 225 that may control charging of the battery 210. For example, the power module 225 may interface with an external wireless charger that charges the battery 210 when interfaced with the ring 104. The charger may include a datum structure that mates with a ring 104 datum structure to create a specified orientation with the ring 104 during 104 charging. The power module 225 may also regulate voltage(s) of the device electronics, regulate power output to the device electronics, and monitor the state of charge of the battery 210. In some implementations, the battery 210 may include a protection circuit module (PCM) that protects the battery 210 from high current discharge, over voltage during 104 charging, and under voltage during 104 discharge. The power module 225 may also include electro-static discharge (ESD) protection.

The one or more temperature sensors 240 may be electrically coupled to the processing module 230-*a*. The temperature sensor 240 may be configured to generate a temperature signal (e.g., temperature data) that indicates a temperature read or sensed by the temperature sensor 240. The processing module 230-*a* may determine a temperature of the user in the location of the temperature sensor 240. For example, in the ring 104, temperature data generated by the temperature sensor 240 may indicate a temperature of a user at the user's finger (e.g., skin temperature). In some implementations, the temperature sensor 240 may contact the user's skin. In other implementations, a portion of the housing 205 (e.g., the inner housing 205-*a*) may form a barrier (e.g., a thin, thermally conductive barrier) between the temperature sensor 240 and the user's skin. In some implementations, portions of the ring 104 configured to contact the user's finger may have thermally conductive portions and thermally insulative portions. The thermally conductive portions may conduct heat from the user's finger to the temperature sensors 240. The thermally insulative portions may insulate portions of the ring 104 (e.g., the temperature sensor 240) from ambient temperature.

In some implementations, the temperature sensor 240 may generate a digital signal (e.g., temperature data) that the processing module 230-*a* may use to determine the temperature. As another example, in cases where the temperature sensor 240 includes a passive sensor, the processing module 230-*a* (or a temperature sensor 240 module) may measure a current/voltage generated by the temperature sensor 240 and determine the temperature based on the measured current/voltage. Example temperature sensors 240 may include a thermistor, such as a negative temperature coefficient (NTC) thermistor, or other types of sensors including resistors, transistors, diodes, and/or other electrical/electronic components.

The processing module 230-*a* may sample the user's temperature over time. For example, the processing module 230-*a* may sample the user's temperature according to a sampling rate. An example sampling rate may include one sample per second, although the processing module 230-*a* may be configured to sample the temperature signal at other sampling rates that are higher or lower than one sample per second. In some implementations, the processing module 230-*a* may sample the user's temperature continuously throughout the day and night. Sampling at a sufficient rate (e.g., one sample per second) throughout the day may provide sufficient temperature data for analysis described herein.

The processing module 230-*a* may store the sampled temperature data in memory 215. In some implementations, the processing module 230-*a* may process the sampled temperature data. For example, the processing module 230-*a* may determine average temperature values over a period of time. In one example, the processing module 230-*a* may determine an average temperature value each minute by summing all temperature values collected over the minute and dividing by the number of samples over the minute. In a specific example where the temperature is sampled at one sample per second, the average temperature may be a sum of all sampled temperatures for one minute divided by sixty seconds. The memory 215 may store the average temperature values over time. In some implementations, the memory 215 may store average temperatures (e.g., one per minute) instead of sampled temperatures in order to conserve memory 215.

The sampling rate, which may be stored in memory 215, may be configurable. In some implementations, the sampling rate may be the same throughout the day and night. In other implementations, the sampling rate may be changed throughout the day/night. In some implementations, the ring 104 may filter/reject temperature readings, such as large spikes in temperature that are not indicative of physiological changes (e.g., a temperature spike from a hot shower). In some implementations, the ring 104 may filter/reject temperature readings that may not be reliable due to other factors, such as excessive motion during 104 exercise (e.g., as indicated by a motion sensor 245).

The ring 104 (e.g., communication module) may transmit the sampled and/or average temperature data to the user device 106 for storage and/or further processing. The user device 106 may transfer the sampled and/or average temperature data to the server 110 for storage and/or further processing.

Although the ring 104 is illustrated as including a single temperature sensor 240, the ring 104 may include multiple temperature sensors 240 in one or more locations, such as arranged along the inner housing 205-*a* near the user's finger. In some implementations, the temperature sensors 240 may be stand-alone temperature sensors 240. Additionally, or alternatively, one or more temperature sensors 240 may be included with other components (e.g., packaged with other components), such as with the accelerometer and/or processor.

The processing module 230-*a* may acquire and process data from multiple temperature sensors 240 in a similar manner described with respect to a single temperature sensor 240. For example, the processing module 230-*a* may individually sample, average, and store temperature data from each of the multiple temperature sensors 240. In other examples, the processing module 230-*a* may sample the sensors at different rates and average/store different values for the different sensors. In some implementations, the processing module 230-*a* may be configured to determine a single temperature based on the average of two or more temperatures determined by two or more temperature sensors 240 in different locations on the finger.

The temperature sensors 240 on the ring 104 may acquire distal temperatures at the user's finger (e.g., any finger). For example, one or more temperature sensors 240 on the ring 104 may acquire a user's temperature from the underside of a finger or at a different location on the finger. In some implementations, the ring 104 may continuously acquire distal temperature (e.g., at a sampling rate). Although distal temperature measured by a ring 104 at the finger is described herein, other devices may measure temperature at the same/different locations. In some cases, the distal temperature measured at a user's finger may differ from the temperature measured at a user's wrist or other external body location. Additionally, the distal temperature measured at a user's finger (e.g., a "shell" temperature) may differ from the user's core temperature. As such, the ring 104 may provide a useful temperature signal that may not be acquired at other internal/external locations of the body. In some cases, continuous temperature measurement at the finger may capture temperature fluctuations (e.g., small or large fluctuations) that may not be evident in core temperature. For example, continuous temperature measurement at the finger may capture minute-to-minute or hour-to-hour temperature fluctuations that provide additional insight that may not be provided by other temperature measurements elsewhere in the body.

The ring 104 may include a PPG system 235. The PPG system 235 may include one or more optical transmitters that transmit light. The PPG system 235 may also include one or more optical receivers that receive light transmitted by the one or more optical transmitters. An optical receiver may generate a signal (hereinafter "PPG" signal) that indicates an amount of light received by the optical receiver. The optical transmitters may illuminate a region of the user's finger. The PPG signal generated by the PPG system 235 may indicate the perfusion of blood in the illuminated region. For example, the PPG signal may indicate blood volume changes in the illuminated region caused by a user's pulse pressure. The processing module 230-*a* may sample the PPG signal and determine a user's pulse waveform based on the PPG signal. The processing module 230-*a* may determine a variety of physiological parameters based on the user's pulse waveform, such as a user's respiratory rate, heart rate, HRV, oxygen saturation, and other circulatory parameters.

In some implementations, the PPG system 235 may be configured as a reflective PPG system 235 where the optical receiver(s) receive transmitted light that is reflected through the region of the user's finger. In some implementations, the PPG system 235 may be configured as a transmissive PPG system 235 where the optical transmitter(s) and optical receiver(s) are arranged opposite to one another, such that light is transmitted directly through a portion of the user's finger to the optical receiver(s).

The number and ratio of transmitters and receivers included in the PPG system 235 may vary. Example optical transmitters may include light-emitting diodes (LEDs). The optical transmitters may transmit light in the infrared spectrum and/or other spectrums. Example optical receivers may include, but are not limited to, photosensors, phototransistors, and photodiodes. The optical receivers may be configured to generate PPG signals in response to the wavelengths received from the optical transmitters. The location of the transmitters and receivers may vary. Additionally, a single device may include reflective and/or transmissive PPG systems 235.

The PPG system 235 illustrated in FIG. 2 may include a reflective PPG system 235 in some implementations. In these implementations, the PPG system 235 may include a centrally located optical receiver (e.g., at the bottom of the ring 104) and two optical transmitters located on each side of the optical receiver. In this implementation, the PPG system 235 (e.g., optical receiver) may generate the PPG signal based on light received from one or both of the optical transmitters. In other implementations, other placements, combinations, and/or configurations of one or more optical transmitters and/or optical receivers are contemplated.

The processing module 230-*a* may control one or both of the optical transmitters to transmit light while sampling the PPG signal generated by the optical receiver. In some implementations, the processing module 230-*a* may cause the optical transmitter with the stronger received signal to transmit light while sampling the PPG signal generated by the optical receiver. For example, the selected optical transmitter may continuously emit light while the PPG signal is sampled at a sampling rate (e.g., 250 Hz).

Sampling the PPG signal generated by the PPG system 235 may result in a pulse waveform that may be referred to as a "PPG." The pulse waveform may indicate blood pressure vs time for multiple cardiac cycles. The pulse waveform may include peaks that indicate cardiac cycles. Additionally, the pulse waveform may include respiratory induced variations that may be used to determine respiration rate. The processing module 230-*a* may store the pulse waveform in memory 215 in some implementations. The processing module 230-*a* may process the pulse waveform as it is generated and/or from memory 215 to determine user physiological parameters described herein.

The processing module 230-*a* may determine the user's heart rate based on the pulse waveform. For example, the processing module 230-*a* may determine heart rate (e.g., in beats per minute) based on the time between peaks in the pulse waveform. The time between peaks may be referred to as an interbeat interval (IBI). The processing module 230-*a* may store the determined heart rate values and IBI values in memory 215.

The processing module 230-*a* may determine HRV over time. For example, the processing module 230-*a* may determine HRV based on the variation in the IBIs. The processing module 230-*a* may store the HRV values over time in the memory 215. Moreover, the processing module 230-*a* may determine the user's respiratory rate over time. For example, the processing module 230-*a* may determine respiratory rate based on frequency modulation, amplitude modulation, or baseline modulation of the user's IBI values over a period of time. Respiratory rate may be calculated in breaths per minute or as another breathing rate (e.g., breaths per 30 seconds). The processing module 230-*a* may store user respiratory rate values over time in the memory 215.

The ring 104 may include one or more motion sensors 245, such as one or more accelerometers (e.g., 6-D accelerometers) and/or one or more gyroscopes (gyros). The motion sensors 245 may generate motion signals that indicate motion of the sensors. For example, the ring 104 may include one or more accelerometers that generate acceleration signals that indicate acceleration of the accelerometers. As another example, the ring 104 may include one or more gyro sensors that generate gyro signals that indicate angular motion (e.g., angular velocity) and/or changes in orientation. The motion sensors 245 may be included in one or more sensor packages. An example accelerometer/gyro sensor is a Bosch BM1160 inertial micro electro-mechanical system (MEMS) sensor that may measure angular rates and accelerations in three perpendicular axes.

The processing module 230-*a* may sample the motion signals at a sampling rate (e.g., 50 Hz) and determine the motion of the ring 104 based on the sampled motion signals. For example, the processing module 230-*a* may sample acceleration signals to determine acceleration of the ring 104. As another example, the processing module 230-*a* may sample a gyro signal to determine angular motion. In some implementations, the processing module 230-*a* may store motion data in memory 215. Motion data may include sampled motion data as well as motion data that is calculated based on the sampled motion signals (e.g., acceleration and angular values).

The ring 104 may store a variety of data described herein. For example, the ring 104 may store temperature data, such as raw sampled temperature data and calculated temperature data (e.g., average temperatures). As another example, the ring 104 may store PPG signal data, such as pulse waveforms and data calculated based on the pulse waveforms (e.g., heart rate values, IBI values, HRV values, and respiratory rate values). The ring 104 may also store motion data, such as sampled motion data that indicates linear and angular motion.

The ring 104, or other computing device, may calculate and store additional values based on the sampled/calculated physiological data. For example, the processing module 230 may calculate and store various metrics, such as sleep metrics (e.g., a Sleep Score), activity metrics, and readiness metrics. In some implementations, additional values/metrics may be referred to as "derived values." The ring 104, or other computing/wearable device, may calculate a variety of values/metrics with respect to motion. Example derived values for motion data may include, but are not limited to, motion count values, regularity values, intensity values, metabolic equivalence of task values (METs), and orientation values. Motion counts, regularity values, intensity values, and METs may indicate an amount of user motion (e.g., velocity/acceleration) over time. Orientation values may indicate how the ring 104 is oriented on the user's finger and if the ring 104 is worn on the left hand or right hand.

In some implementations, motion counts and regularity values may be determined by counting a number of acceleration peaks within one or more periods of time (e.g., one or more 30 second to 1 minute periods). Intensity values may indicate a number of movements and the associated intensity (e.g., acceleration values) of the movements. The intensity values may be categorized as low, medium, and high, depending on associated threshold acceleration values. METs may be determined based on the intensity of movements during a period of time (e.g., 30 seconds), the regularity/irregularity of the movements, and the number of movements associated with the different intensities.

In some implementations, the processing module 230-*a* may compress the data stored in memory 215. For example, the processing module 230-*a* may delete sampled data after making calculations based on the sampled data. As another example, the processing module 230-*a* may average data over longer periods of time in order to reduce the number of stored values. In a specific example, if average temperatures for a user over one minute are stored in memory 215, the processing module 230-*a* may calculate average temperatures over a five minute time period for storage, and then subsequently erase the one minute average temperature data. The processing module 230-*a* may compress data based on a variety of factors, such as the total amount of used/available memory 215 and/or an elapsed time since the ring 104 last transmitted the data to the user device 106.

Although a user's physiological parameters may be measured by sensors included on a ring 104, other devices may measure a user's physiological parameters. For example, although a user's temperature may be measured by a temperature sensor 240 included in a ring 104, other devices may measure a user's temperature. In some examples, other wearable devices (e.g., wrist devices) may include sensors that measure user physiological parameters. Additionally, medical devices, such as external medical devices (e.g., wearable medical devices) and/or implantable medical devices, may measure a user's physiological parameters. One or more sensors on any type of computing device may be used to implement the techniques described herein.

The physiological measurements may be taken continuously throughout the day and/or night. In some implementations, the physiological measurements may be taken during 104 portions of the day and/or portions of the night. In some implementations, the physiological measurements may be taken in response to determining that the user is in a specific state, such as an active state, resting state, and/or a sleeping state. For example, the ring 104 can make physiological measurements in a resting/sleep state in order to acquire cleaner physiological signals. In one example, the ring 104 or other device/system may detect when a user is resting and/or sleeping and acquire physiological parameters (e.g., temperature) for that detected state. The devices/systems may use the resting/sleep physiological data and/or other data when the user is in other states in order to implement the techniques of the present disclosure.

In some implementations, as described previously herein, the ring 104 may be configured to collect, store, and/or process data, and may transfer any of the data described herein to the user device 106 for storage and/or processing. In some aspects, the user device 106 includes a wearable application 250, an operating system (OS), a web browser application (e.g., web browser 280), one or more additional applications, and a GUI 275. The user device 106 may further include other modules and components, including sensors, audio devices, haptic feedback devices, and the like. The wearable application 250 may include an example of an application (e.g., "app") that may be installed on the user device 106. The wearable application 250 may be configured to acquire data from the ring 104, store the acquired data, and process the acquired data as described herein. For example, the wearable application 250 may include a user interface (UI) module 255, an acquisition module 260, a processing module 230-*b*, a communication module 220-*b*, and a storage module (e.g., database 265) configured to store application data.

The various data processing operations described herein may be performed by the ring 104, the user device 106, the servers 110, or any combination thereof. For example, in some cases, data collected by the ring 104 may be pre-processed and transmitted to the user device 106. In this example, the user device 106 may perform some data processing operations on the received data, may transmit the data to the servers 110 for data processing, or both. For instance, in some cases, the user device 106 may perform processing operations that require relatively low processing power and/or operations that require a relatively low latency, whereas the user device 106 may transmit the data to the servers 110 for processing operations that require relatively high processing power and/or operations that may allow relatively higher latency.

In some aspects, the ring 104, user device 106, and server 110 of the system 200 may be configured to evaluate sleep patterns for a user. In particular, the respective components of the system 200 may be used to collect data from a user via the ring 104, and generate one or more scores (e.g., Sleep Score, Readiness Score) for the user based on the collected data. For example, as noted previously herein, the ring 104 of the system 200 may be worn by a user to collect data from the user, including temperature, heart rate, HRV, and the like. Data collected by the ring 104 may be used to determine when the user is asleep in order to evaluate the user's sleep for a given "sleep day." In some aspects, scores may be calculated for the user for each respective sleep day, such that a first sleep day is associated with a first set of scores, and a second sleep day is associated with a second set of scores. Scores may be calculated for each respective sleep day based on data collected by the ring 104 during the respective sleep day. Scores may include, but are not limited to, Sleep Scores, Readiness Scores, and the like.

In some cases, "sleep days" may align with the traditional calendar days, such that a given sleep day runs from midnight to midnight of the respective calendar day. In other cases, sleep days may be offset relative to calendar days. For example, sleep days may run from 6:00 pm (18:00) of a calendar day until 6:00 pm (18:00) of the subsequent calendar day. In this example, 6:00 pm may serve as a "cut-off time," where data collected from the user before 6:00 pm is counted for the current sleep day, and data collected from the user after 6:00 pm is counted for the subsequent sleep day. Due to the fact that most individuals sleep the most at night, offsetting sleep days relative to calendar days may enable the system 200 to evaluate sleep patterns for users in such a manner that is consistent with their sleep schedules. In some cases, users may be able to selectively adjust (e.g., via the GUI) a timing of sleep days relative to calendar days so that the sleep days are aligned with the duration of time that the respective users typically sleep.

In some implementations, each overall score for a user for each respective day (e.g., Sleep Score, Readiness Score) may be determined/calculated based on one or more "contributors," "factors," or "contributing factors." For example, a user's overall Sleep Score may be calculated based on a set of contributors, including: total sleep, efficiency, restfulness, REM sleep, deep sleep, latency, timing, or any combination thereof. The Sleep Score may include any quantity of contributors. The "total sleep" contributor may refer to the sum of all sleep periods of the sleep day. The "efficiency" contributor may reflect the percentage of time spent asleep compared to time spent awake while in bed, and may be calculated using the efficiency average of long sleep periods (e.g., primary sleep period) of the sleep day, weighted by a duration of each sleep period. The "restfulness" contributor may indicate how restful the user's sleep is, and may be calculated using the average of all sleep periods of the sleep day, weighted by a duration of each period. The restfulness contributor may be based on a "wake up count" (e.g., sum of all the wake-ups (when user wakes up) detected during different sleep periods), excessive movement, and a "got up count" (e.g., sum of all the got-ups (when user gets out of bed) detected during the different sleep periods).

The "REM sleep" contributor may refer to a sum total of REM sleep durations across all sleep periods of the sleep day including REM sleep. Similarly, the "deep sleep" contributor may refer to a sum total of deep sleep durations across all sleep periods of the sleep day including deep sleep. The "latency" contributor may signify how long (e.g., average, median, longest) the user takes to go to sleep, and may be calculated using the average of long sleep periods throughout the sleep day, weighted by a duration of each period and the number of such periods (e.g., consolidation of a given sleep stage or sleep stages may be its own contributor or weight other contributors). Lastly, the "timing" contributor may refer to a relative timing of sleep periods within the sleep day and/or calendar day, and may be calculated using the average of all sleep periods of the sleep day, weighted by a duration of each period.

By way of another example, a user's overall Readiness Score may be calculated based on a set of contributors, including: sleep, sleep balance, heart rate, HRV balance, recovery index, temperature, activity, activity balance, or any combination thereof. The Readiness Score may include any quantity of contributors. The "sleep" contributor may refer to the combined Sleep Score of all sleep periods within the sleep day. The "sleep balance" contributor may refer to a cumulative duration of all sleep periods within the sleep day. In particular, sleep balance may indicate to a user whether the sleep that the user has been getting over some duration of time (e.g., the past two weeks) is in balance with the user's needs. Typically, adults need 7-9 hours of sleep a night to stay healthy, alert, and to perform at their best both mentally and physically. However, it is normal to have an occasional night of bad sleep, so the sleep balance contributor takes into account long-term sleep patterns to determine whether each user's sleep needs are being met. The "resting heart rate" contributor may indicate a lowest heart rate from the longest sleep period of the sleep day (e.g., primary sleep period) and/or the lowest heart rate from naps occurring after the primary sleep period.

Continuing with reference to the "contributors" (e.g., factors, contributing factors) of the Readiness Score, the "HRV balance" contributor may indicate a highest HRV average from the primary sleep period and the naps happening after the primary sleep period. The HRV balance contributor may help users keep track of their recovery status by comparing their HRV trend over a first time period (e.g., two weeks) to an average HRV over some second, longer time period (e.g., three months). The "recovery index" contributor may be calculated based on the longest sleep period. Recovery index measures how long it takes for a user's resting heart rate to stabilize during the night. A sign of a very good recovery is that the user's resting heart rate stabilizes during the first half of the night, at least six hours before the user wakes up, leaving the body time to recover for the next day. The "body temperature" contributor may be calculated based on the longest sleep period (e.g., primary sleep period) or based on a nap happening after the longest sleep period if the user's highest temperature during the nap is at least 0.5° C. higher than the highest temperature during the longest period. In some aspects, the ring may measure a user's body temperature while the user is asleep, and the system 200 may display the user's average temperature relative to the user's baseline temperature. If a user's body temperature is outside of their normal range (e.g., clearly above or below 0.0), the body temperature contributor may be highlighted (e.g., go to a "Pay attention" state) or otherwise generate an alert for the user.

In some examples, the inner housing 205-*a* and the outer housing 205-*b* may be formed of conductive material (e.g., metal), a configuration that may provide various advantages relative to other configurations. For example, use of conductive material for the inner housing 205-*a* may increase comfort for the user as well as improve sensing by the PPG system 235 (e.g., by more effectively preventing light leakage between optical transmitters and photosensors), among other advantages. And use of conductive material for the outer housing 205-*b* may decrease manufacturing complexity and/or cost, among other advantages.

But use of conductive material for the inner housing 205-*a* and the outer housing 205-*b* may inhibit penetration of electromagnetic fields through the wearable device, which may negatively impact the communication abilities of the wearable device if the wearable device includes an internal antenna. According to the designs described herein, a wearable device may include one or more slot antennas in the external surface(s) of the wearable device (e.g., in the inner housing 205-*a*, in the outer housing 205-*b*) so that use of conductive materials for the external surface(s) does not interfere with electromagnetic fields transmitted and received by the slot antennas.

Figure 3:
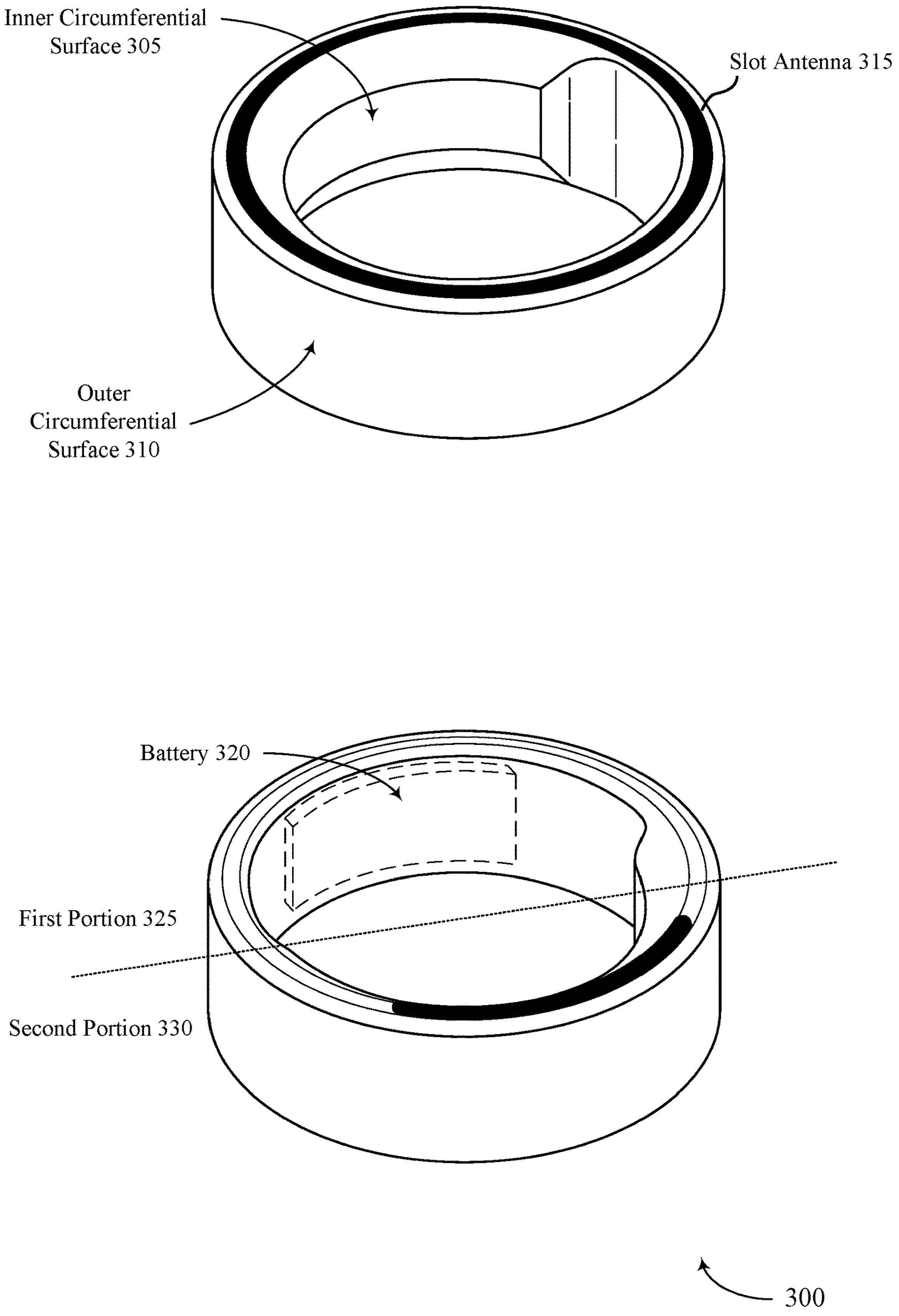
FIG. 3 illustrates an example of a wearable device that supports a slot antenna in accordance with aspects of the present disclosure.

FIG. 3 illustrates an example of a wearable device 300 that supports a slot antenna in a wearable device in accordance with aspects of the present disclosure. The wearable device 300 may be a wearable ring device and may include an inner circumferential surface 305 and an outer circumferential surface 310. The wearable device 300 may also include one or more sensor(s) (e.g., within apertures of the inner circumferential surface 305) that are configured to sense physiological data for a user by interfacing with a user's skin. The sensors may be coupled with a circuit board (e.g., a flexible printed circuit board) and may exchange signals with the circuit board. The wearable device 300 may include a communication module (e.g., a transceiver) that is configured to transmit and receive electromagnetic signals via one or more slot antennas 315. The wearable device 300 may also include a battery 320 that is configured to provide power to the electrical components of the wearable device 300 (e.g., the sensors, the circuit board, the communication module).

Although described with reference to a wearable ring device with circumferential surfaces, the designs described herein may be implemented in other types of wearable devices (e.g., wearable watch devices, wearable ankle devices, wearable ear devices), regardless of the curvature of the surfaces.

The wearable device 300 may include a slot antenna 315 along the edge (also referred to as the periphery or rim) of the wearable device 300. The slot antenna 315 may comprise a slot of non-conductive material (e.g., air, epoxy, polymer, ceramic, or plastic) circumferentially surrounded by conductive material so that current (e.g., radio frequency (RF) current) flowing around the conductive material generates an electromagnetic field that radiates from the boundaries of the slot. In some examples, the slot antenna 315 may completely circumnavigate the perimeter of the wearable device 300 as shown in the top figure (e.g., the slot antenna 315 may have a ring form, also referred to as a circle or enclosed annular form). In other examples, the slot antenna 315 may only partially circumnavigate the perimeter of the wearable device 300 (e.g., the slot antenna 315 may be formed as an arc as shown in the bottom figure).

In some examples, one or both of the inner circumferential surface 305 and the outer circumferential surface 310 may be formed partially or completely of a conductive material, such as metal. In such a scenario, placement of a slot antenna 315 on the exterior surface of the wearable device 300 (as opposed to placement of a different type of antenna within the wearable device 300) may prevent the inner circumferential surface 305 and the outer circumferential surface 310 from blocking electromagnetic signals transmitted or received by the slot antenna 315. Regardless of the composition of the inner circumferential surface 305 and the outer circumferential surface 310, placement of the slot antenna 315 on the exterior surface of the wearable device 300 may free up space within the wearable device 300 (or on the circuit board) that would otherwise be used for another type of antenna (e.g., a dipole antenna, a planar antenna, a trace antenna).

If the slot antenna 315 is in the form of an arc, the slot antenna 315 may be on a portion of the wearable device 300 that is opposite the battery 320. For example, if the battery 320 is disposed within a first portion 325 of the wearable device 300 the slot antenna 315 may be disposed on a second portion 330 that is opposite of the first portion 325. Placing the slot antenna 315 opposite the battery 320 may prevent the battery 320 from interfering with the function of the slot antenna 315 (e.g., because the battery 320 may capacitively couple with the conductive surfaces, creating a short circuit). In some examples, the sensors may be included in the second portion 330.

If the slot antenna 315 is circular, the effective arc length ($A_{EFF}$) of the slot antenna 315 (e.g., the portion of the slot antenna that radiates) may be $A_{EFF}=360°-x°$, where x° is the arc length of the battery 320 in degrees. For instance, the effective arc length may be ~180° because the other ~180° (e.g., x) may be blocked by the battery 320, which may act as short circuit between the inner circumferential surface 305 and the outer circumferential surface 310. So, the functionality of the slot antenna may be effectively the same for a circle-form antenna and an arc-form slot antenna. However, use of circle-form slot antenna may provide various advantages relative to the arc-form slot antenna, such as manufacturing advantages.

Although shown with a single slot antenna 315, the wearable device 300 may include multiple slot antennas, the addition of which may further improve the communication ability of the wearable device 300. For example, if the slot antenna 315 is on the upper rim surface of the wearable device 300, the wearable device 300 may include a second slot antenna on the lower rim surface of the wearable device. Similar to the slot antenna 315, which may be a ring of non-conductive material (e.g., air, epoxy, polymer, ceramic, plastic) that is concentric with the inner circumferential surface 305 and the outer circumferential surface 310, the second slot antenna may be a ring of non-conductive material that is concentric with the inner circumferential surface 305 and the outer circumferential surface 310. If the slot antenna 315 is an arc of non-conductive material that is concentric with the inner circumferential surface 305 and the outer circumferential surface 310, the second slot antenna may also be an arc of non-conductive material that is concentric with the inner circumferential surface 305 and the outer circumferential surface 310.

Figure 4:
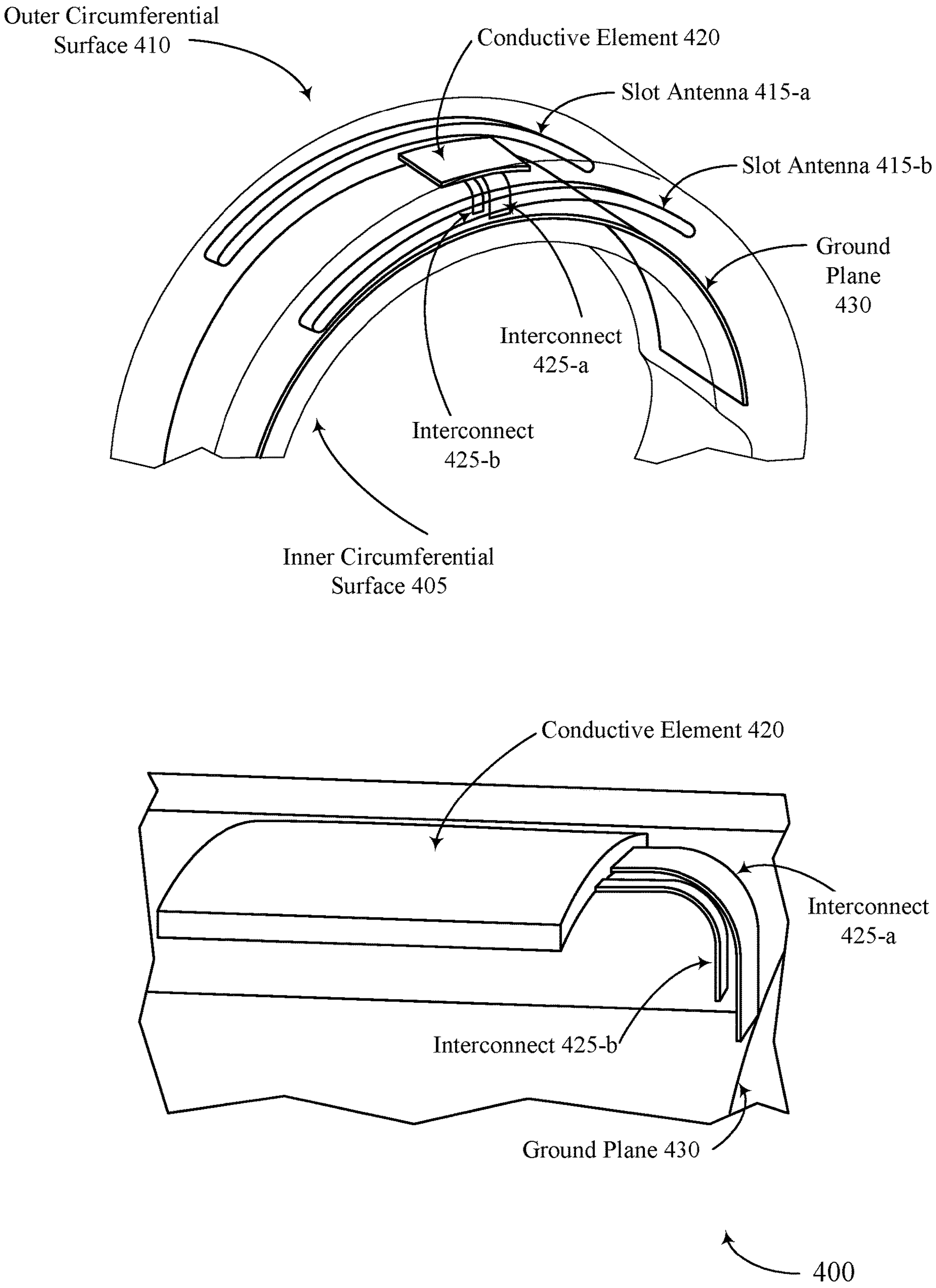
FIG. 4 illustrates an example of a wearable device that supports a slot antenna in a wearable device in accordance with aspects of the present disclosure.

FIG. 4 illustrates views from different perspectives of a wearable device 400 that supports a slot antenna in accordance with aspects of the present disclosure. The wearable device 400 may be an example of a wearable device 104 or a wearable device 300 as described herein. The wearable device 400 may include an inner circumferential surface 405 and an outer circumferential surface 410, both of which may be formed of a conductive material. The wearable device 400 may be configured to collect physiological data from a user and to wirelessly communicate that physiological data to a user device. Thus, the wearable device 400 may include various electrical components as described herein. The wearable device 400 may also include one or more slot antennas 415 that are configured to radiate electromagnetic fields for wireless communications. A close-up view of the wearable device 400 is shown in the bottom figure.

To operate the slot antennas 415, the wearable device 400 may include a communication module that is configured to energize the slot antennas 415. For example, the communication module (e.g., a transceiver) may be configured to apply electrical signals (e.g., voltages, currents) directly to the interior wall of the outer circumferential surface 410 (e.g., via a galvanic connection) or to a conductive element 420 that is capacitively coupled with the outer circumferential surface 410. The communication module may be coupled with the interior wall of the outer circumferential surface 410 (or to the conductive element 420) via interconnect 425-*b*. Thus, an antenna feed potential may be generated at the outer circumferential surface 410.

An interconnect may also be referred to as a feed element, a transmission line, or other suitable terminology. The conductive element 420 may be a conductive plate, as shown, or may be a conductive microstrip line (e.g., a thin strip of conductive material).

To complete the electrical circuit (and generate an antenna ground potential at the inner circumferential surface 405), the wearable device 400 may include interconnect 425-*a*, which may couple the ground plane 430 with the interior wall of the outer circumferential surface 410 (or with the conductive element 420). Generation of an antenna feed potential at the outer circumferential surface 410 and an antenna ground potential at the inner circumferential surface 405 may cause current to flow around the slot antennas 415 such that an electromagnetic field is radiated, thus enabling wireless communications. In some examples, the ground plane 430 is the ground plane of the circuit board.

Thus, the wearable device 400 may support use of a galvanic feed (e.g., where the communication module is directly coupled with the interior wall of the outer circumferential surface 410) or a capacitive feed (e.g., where the communication module is coupled with the conductive element 420 that is capacitively coupled with the outer circumferential surface 410). Use of a galvanic feed may be associated with various electrical advantages, whereas use of a capacitive feed may reduce electro-static discharge (ESD) issues, simplify mechanical implementation, and allow for larger mechanical tolerances, among other potential advantages.

Although described with reference to the outer circumferential surface 410, the galvanic feed (or capacitive feed) may be coupled with the interior wall of the inner circumferential surface 405 and the ground plane may be along the outer circumferential surface 410.

Although described with reference to a wearable ring device with circumferential surfaces, the designs described herein may be implemented in other types of wearable devices (e.g., wearable watch devices, wearable ankle devices, wearable ear devices), regardless of the curvature of the surfaces.

Figure 5:
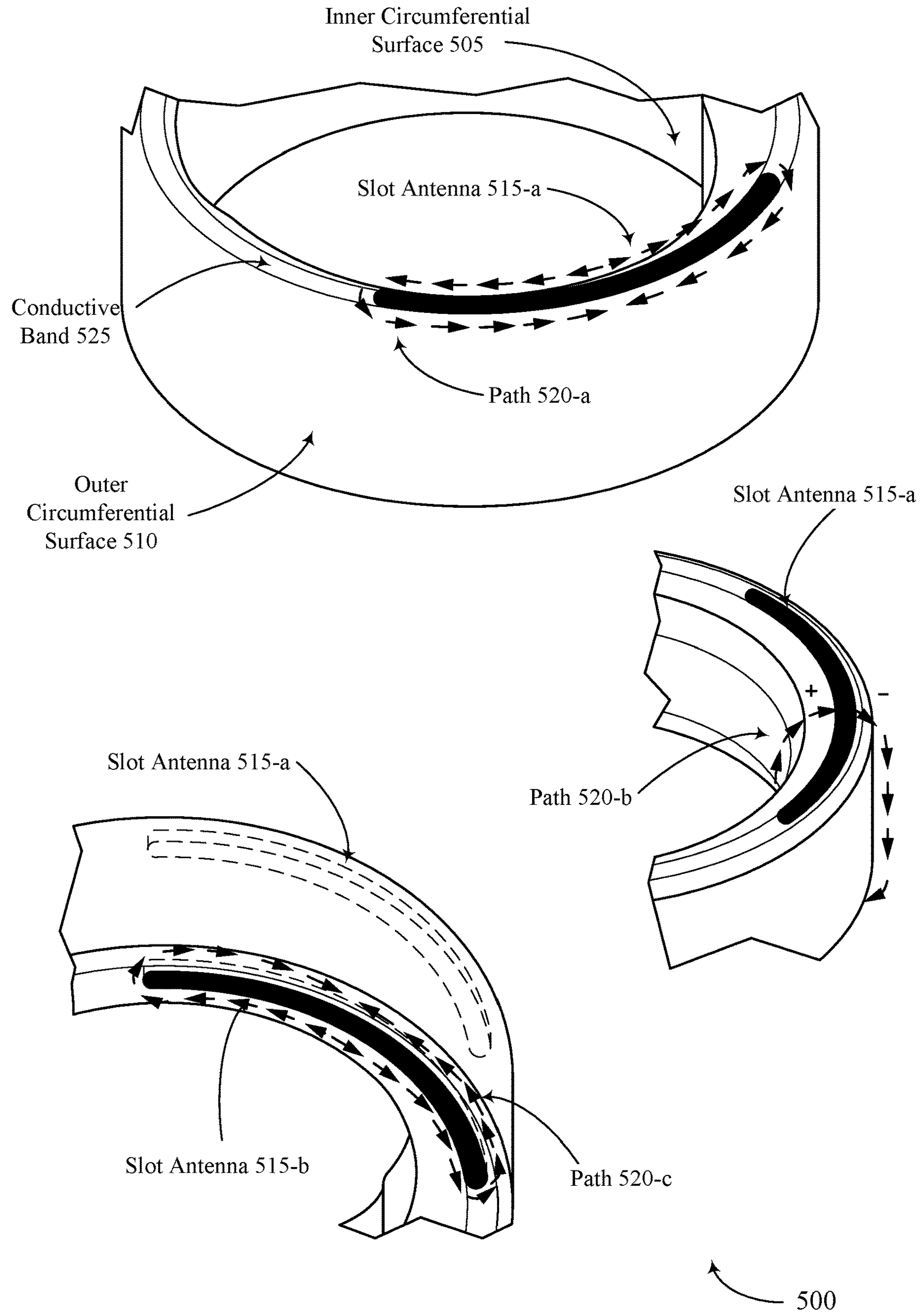
FIG. 5 illustrates an example of a wearable device that supports a slot antenna in accordance with aspects of the present disclosure.

FIG. 5 illustrates different views of a wearable device 500 that supports a slot antenna in accordance with aspects of the present disclosure. The wearable device 500 may be a wearable ring device and may include an inner circumferential surface 505 and an outer circumferential surface 510. The wearable device 500 may also include one or more sensor(s) (e.g., within apertures of the inner circumferential surface 505) that are configured to sense physiological data for a user by interfacing with a user's skin. The sensors may be coupled with a circuit board (e.g., a flexible printed circuit board) and may exchange signals with the circuit board. The wearable device 500 may include a communication module (e.g., a transceiver) that is configured to transmit and receive electromagnetic signals via one or more slot antennas 515. The wearable device 500 may also include a battery configured to provide power to the electrical components of the wearable device 500 (e.g., the sensors, the circuit board, the communication module).

The slot antenna 515-*a* may be formed of a non-conductive material (e.g., air, epoxy, polymer, plastic) and may be surrounded by conductive material so that current flows around the boundaries of the slot antenna. For example, current may flow along a conductive path such as path 520-*a*, which may include a portion of the inner circumferential surface 505 and a portion of the outer circumferential surface 510. In some examples, the path 520-*a* may include a portion of the conductive band 525, which may be disposed between (and connect) the inner circumferential surface 505 with the outer circumferential surface 510. A non-conductive material may also be referred to as an insulative material.

In some examples, the inner circumferential surface 505 and the outer circumferential surface 510 may be formed of a conductive material. In such examples, a conductive path, such as the path 520-*b*, with lower impedance than the conductive path 520-*a* may form and current may flow in the wrong direction for the slot to function as a slot antenna. For example, current may flow vertically around the body of the wearable device 500 as opposed to horizontally around the perimeter of the slot antenna 515-*a*. Due to their small dimensions, wearable ring devices (or other small wearable devices) may be particularly susceptible to such electrical phenomenon (e.g., because the vertical path 520-*b* is much shorter than the horizontal path 520-*a*). So, the use of two slot antennas may be particularly beneficial in wearable devices with sizes that allow formation of conductive paths that are shorter than the perimeter(s) of the slot antenna(s). It should be appreciated that reducing the length of the slot antennas may not be a viable alternative solution because the wavelength radiated by the slot antennas may be a function of the slot length.

To prevent current flow in the wrong direction (e.g., along the path 520-*b*, which is orthogonal to the path 520-*a*) the wearable device 500 may include a second slot antenna, such as the slot antenna 515-*b*. The slot antenna 515-*b* may be positioned to interrupt the conductive path 520-*b* (e.g., by adding high impedance) so that current flows concurrently along the conductive path 520-*a* and the conductive path 520-*c*. For example, the slot antenna 515-*b* may be disposed along the edge of the wearable device 500 that is opposite the edge with the slot antenna 515-*a*. In some examples, the slot antenna 515-*b* may be positioned directly below the slot antenna 515-*a*. Put another way, the radial placement of the slot antenna 515-*b* along the bottom circumferential edge of the wearable device 500 may match the radial placement of the slot antenna 515-*a* along the top circumferential edge. A circumferential edge may also be referred to as a rim, a rim surface, or other suitable terminology.

In addition to cutting off the path 520-*b*, use of two slot antennas 515 may improve the communication ability of the wearable device 500 because one of the slot antennas 515 may continue to function (e.g., transmit, receive) even if physical coverage of the other slot antenna 515 (e.g., by a finger of the user) renders that slot antenna inoperable. So, the wearable device 500 may continue to wirelessly communicate with another device even if the user inadvertently covers one of the slot antennas 515.

Although shown with the slot antennas 515 on opposing rim surfaces of the wearable device 500 (e.g., disposed on the upper rim surface and the lower rim surface), the slot antennas 515 may be disposed on other surfaces of the wearable device 500. In such examples, the slot antennas 515 may be configured (e.g., aligned radially) so that current flows around the perimeter of each slot antenna 515 and so that any lower-impedance alternative path(s) orthogonal to the perimeters of the slot antennas are effectively blocked by the slot antennas. In one example, slot antenna 515-*a* may be disposed on the inner circumferential surface 505 and slot antenna 515-*b* may be disposed on the outer circumferential surface 510. In another example, slot antenna 515-*a* and slot antenna 515-*b* may both be disposed on the inner circumferential surface 505. In another example, slot antenna 515-*a* and slot antenna 515-*b* may both be disposed on the outer circumferential surface 510. In another example, slot antenna 515-*a* may be disposed on one of the rim surfaces and slot antenna 515-*b* may be disposed on the inner circumferential surface 505 or the outer circumferential surface 510. Other configurations of the slot antennas are contemplated and within the scope of the present disclosure.

In some examples, the inner circumferential surface 505 and the outer circumferential surface 510 may be formed primarily of a non-conductive material but may include portions of conductive material to enable use of the slot antenna 515-*a*. For example, at least the portions of the inner circumferential surface 505 and the outer circumferential surface 510 in contact with the slot antenna 515-*a* may be made up of conductive material so as to enable the flow of current around the perimeter of the slot antenna 515-*a*. In such examples, the slot antenna 515-*b* may be omitted (e.g., because the non-conductive portions of the circumferential surfaces may prevent formation of the conductive path 520-*b*).

Although described with reference to a wearable ring device with circumferential surfaces, the designs described herein may be implemented in other types of wearable devices (e.g., wearable watch devices, wearable ankle devices, wearable ear devices), regardless of the curvature of the surfaces.

Figure 6:
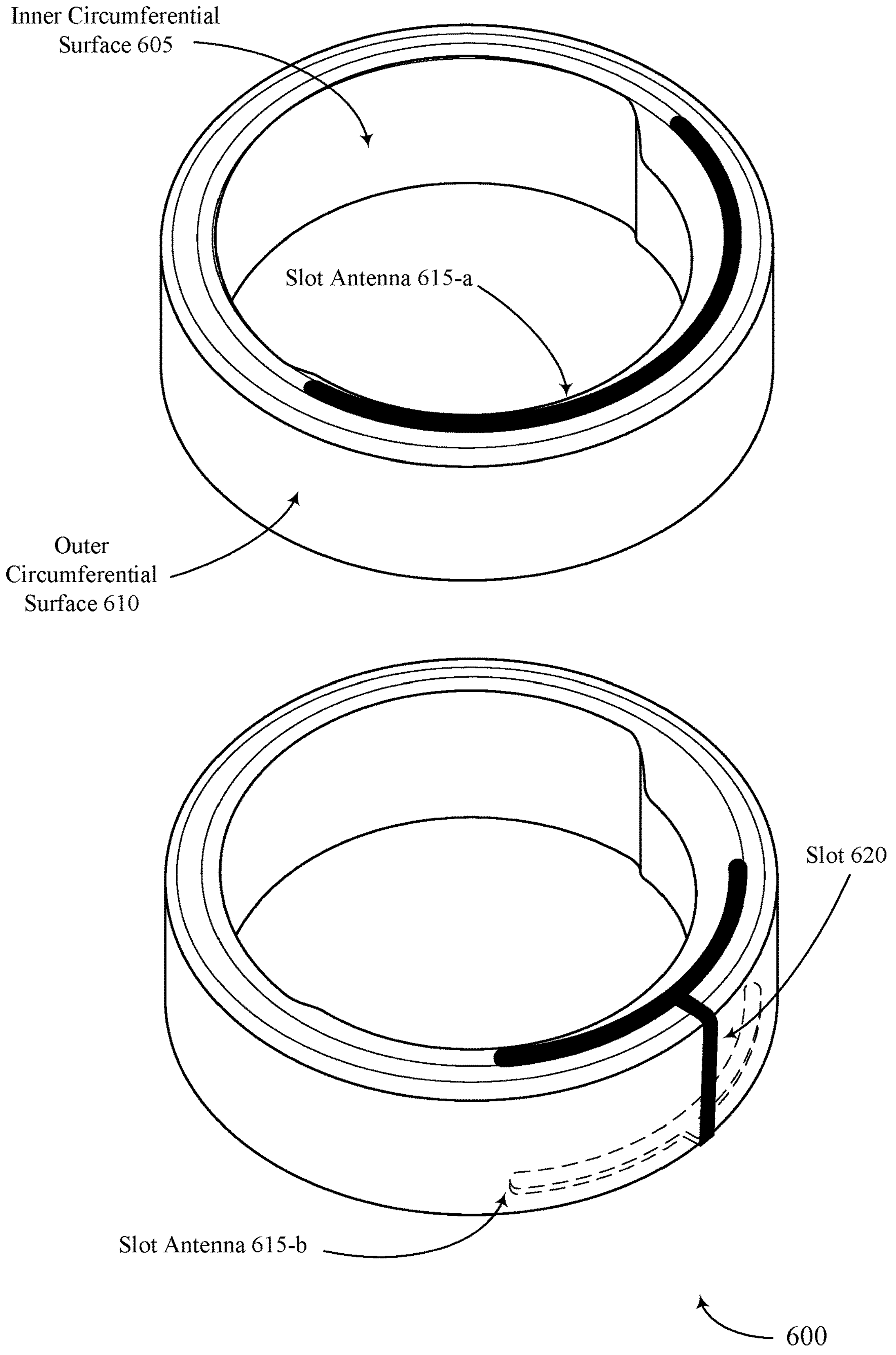
FIG. 6 illustrates an example of a wearable device that supports a slot antenna in accordance with aspects of the present disclosure.

FIG. 6 illustrates different views of a wearable device 600 that supports a slot antenna in accordance with aspects of the present disclosure. The wearable device 600 may be a wearable ring device and may include an inner circumferential surface 605 and an outer circumferential surface 610. The wearable device 600 may also include one or more sensor(s) (e.g., within apertures of the inner circumferential surface 605) that are configured to sense physiological data for a user by interfacing with a user's skin. The sensors may be coupled with a circuit board (e.g., a flexible printed circuit board) and may exchange signals with the circuit board. The wearable device 600 may include a communication module (e.g., a transceiver) that is configured to transmit and receive electromagnetic signals via one or more slot antennas 615. The wearable device 600 may also include a battery configured to provide power to the electrical components of the wearable device 600 (e.g., the sensors, the circuit board, the communication module).

The wearable device 600 may include a slot antenna 615-*a* that is disposed on the inner circumferential surface near the top of the wearable device 600 (e.g., as opposed to being disposed on the top edge of the wearable device as illustrated in FIGS. 3 through 5). In some examples, the wearable device 600 may include a second slot antenna 615-*b* disposed on the inner circumferential surface near the bottom of the wearable device 600. Addition of the second slot antenna 615-*b* may improve the communication ability of the wearable device 600 by reducing the likelihood that both slot antennas are covered (e.g., by fingers) at the same time.

In some examples, a vertical slot, such as the slot 620 may be added so that an H-shaped slot antenna is formed. For example, the slot 620 may connect the upper slot antenna 615-*a* and the lower slot antenna 615-*b* to form a slot antenna that includes two parallel slots joined by slot that is perpendicular to the parallel slots. Addition of the vertical slot 620 may improve antenna performance by focusing the electric field generated by the slot antenna along the outer circumferential surface (which may be less likely to be covered than other portions of the wearable device 600). Placement of the vertical slot 620 in the middle of the horizontal slots may (relative to other placement positions) maximize the electric field radiated by slot antenna on the outer circumferential surface.

Although described with reference to a wearable ring device with circumferential surfaces, the designs described herein may be implemented in other types of wearable devices (e.g., wearable watch devices, wearable ankle devices, wearable ear devices), regardless of the curvature of the surfaces.

Figure 7:
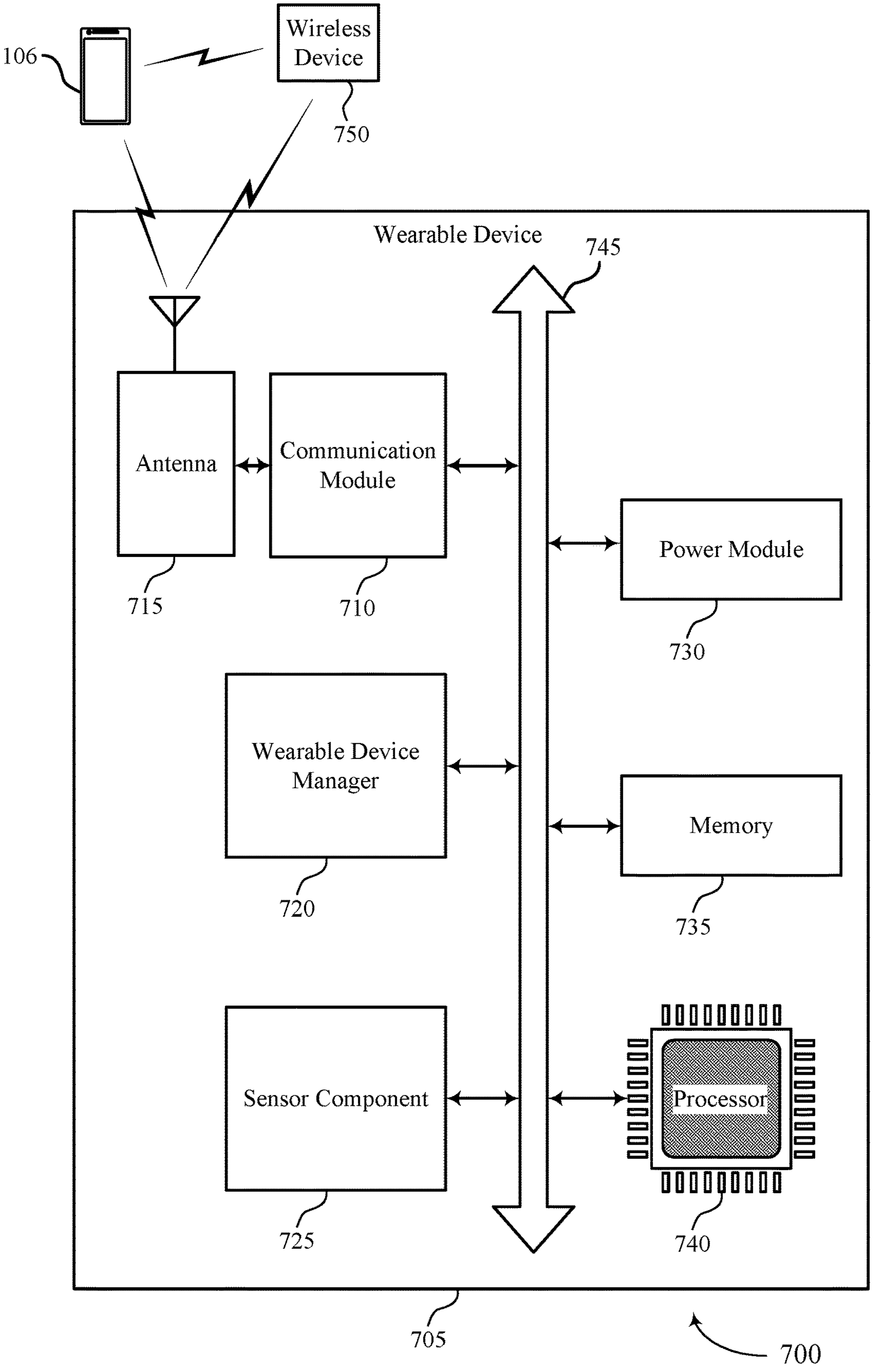
FIG. 7 shows a diagram of a system that supports wearable device with a slot antenna in accordance with aspects of the present disclosure.

FIG. 7 shows a diagram of a system 700 including a device 705 that supports detachable battery in a wearable ring device in accordance with aspects of the present disclosure. The device 705 may be an example of or include the components of a wearable device as described herein. The device 705 may include an example of a wearable device 104, as described previously herein. The device 705 may include components for bi-directional communications including components for transmitting and receiving data with a user device 106 and a server 110, such as a wearable device manager 720, a communication module 710, an antenna 715, a sensor component 725, a power module 730, a memory 735, a processor 740, and a wireless device 750. These components may be in electronic communication or otherwise coupled (e.g., operatively, communicatively, functionally, electronically, electrically) via one or more buses (e.g., a bus 745).

In some examples, the device 705 may include an inner circumferential surface comprising a first conductive material and configured to interface with the skin of a user; an outer circumferential surface comprising a second conductive material and opposite the inner circumferential surface; a first slot antenna disposed along a first rim surface of the wearable device between the inner circumferential surface and the outer circumferential surface; and a second slot antenna disposed along a second rim surface of the wearable device opposite the first rim surface and between the inner circumferential surface and the outer circumferential surface.

In some examples, the first conductive material and the second conductive material may be different materials. In some examples, the first conductive material and the second conductive material may be the same material. In some examples, the inner circumferential surface consists of the first conductive material, and the outer circumferential surface consists of the second conductive material.

In some examples, the first slot antenna and the second slot antenna are configured so that current flows along the first rim surface and around a first perimeter of the first slot antenna. In some examples, the first slot antenna and the second slot antenna are configured so that current flows along the second rim surface and around a second perimeter of the second slot antenna.

In some examples, the second slot antenna is configured such that current flows around a perimeter of the first slot antenna and such that current is prevented from flowing along an alternative path orthogonal to the perimeter of the first slot antenna.

In some examples, the device 705 includes a slot that is disposed on the outer circumferential surface and that connects the first slot antenna with the second slot antenna. In some examples, the first rim surface comprises an upper rim surface and the second rim surface comprises a lower rim surface opposite the upper rim surface.

In some examples, the first slot antenna comprises a first non-conductive material and the first rim surface comprises a conductive material, and the second slot antenna comprises a second non-conductive material and the second rim surface comprises the conductive material.

In some examples, the first non-conductive material, the second non-conductive material, or both, comprises air, epoxy, polymer, ceramic, or plastic.

In some examples, the first slot antenna comprises a first ring of non-conductive material that is concentric with the inner circumferential surface and the outer circumferential surface. In some examples, the second slot antenna comprises a second ring of non-conductive material that is concentric with the inner circumferential surface and the outer circumferential surface.

In some examples, the first slot antenna comprises a first arc of non-conductive material that is concentric with the inner circumferential surface and the outer circumferential surface. In some examples, the second slot antenna comprises a second arc of non-conductive material that is concentric with the inner circumferential surface and the outer circumferential surface.

In some examples, the device 705 includes a communication module within the wearable device and coupled, via a first interconnect, with a conductive element that is configured to capacitively couple with the outer circumferential surface or the inner circumferential surface, the communication module configured to energize the first slot antenna and the second slot antenna by applying electrical signals to the conductive element via the first interconnect. In some examples, the conductive element comprises a conductive plate or a microstrip line. In some examples, the device 705 includes a circuit board comprising a ground plane that is coupled with the conductive element via a second interconnect.

In some examples, the device 705 includes a communication module within the wearable device and coupled with an interior wall of the outer circumferential surface, the communication module configured to energize the first slot antenna and the second slot antenna by applying electrical signals to the interior wall.

In some examples, the first slot antenna and the second slot antenna are on a first portion of the wearable device. In some examples, the device 705 includes a battery disposed within a second portion of the wearable device that is opposite the first portion. In some examples, the device 705 includes a set of one or more sensors coupled with the inner circumferential surface and configured to collect physiological data from the user, the set of one or more sensors disposed within the first portion of the wearable device.

In some examples, the device 705 includes an inner circumferential surface comprising a first conductive material and configured to interface with the skin of a user; an outer circumferential surface comprising a second conductive material and opposite the inner circumferential surface; a first slot antenna disposed along one of a first rim surface of the wearable device, a second rim surface of the wearable ring, the inner circumferential surface, and the outer circumferential surface; and a second slot antenna disposed along one of the first rim surface of the wearable device, the second rim surface of the wearable device, the inner circumferential surface, and the outer circumferential surface, the second slot antenna configured such that current flows around a perimeter of the first slot antenna and such that current is prevented from flowing along an alternative path orthogonal to the perimeter of the first slot antenna.

In some examples, the first slot antenna is configured such that current flows around a perimeter of the second slot antenna. In some examples, the device 705 includes a communication module within the wearable device and coupled, via a first interconnect, with a conductive element that is configured to capacitively couple with the outer circumferential surface or the inner circumferential surface, the communication module configured to energize the first slot antenna and the second slot antenna by applying electrical signals to the conductive element via the first interconnect.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A wearable ring device, comprising:

an inner curved surface comprising a first conductive material and configured to interface with the skin of a user;

an outer curved surface comprising a second conductive material and opposite the inner curved surface;

a first slot antenna disposed along a first rim surface of the wearable ring device between the inner curved surface and the outer curved surface;

a second slot antenna disposed along a second rim surface of the wearable ring device that is opposite and parallel to the first rim surface, the second slot antenna between the inner curved surface and the outer curved surface; and a slot, disposed on the outer curved surface between the parallel first and second rim surfaces, that connects the first slot antenna with the second slot antenna and that focuses an electric field generated by the first slot antenna and the second slot antenna along the outer curved surface.

2. The wearable ring device of claim 1, wherein the first conductive material and the second conductive material comprise different materials.

3. The wearable ring device of claim 1, wherein the inner curved surface consists of the first conductive material, and wherein the outer curved surface consists of the second conductive material.

4. The wearable ring device of claim 1, wherein the first slot antenna and the second slot antenna are configured so that current flows along the first rim surface and around a perimeter of the first slot antenna.

5. The wearable ring device of claim 4, wherein the first slot antenna and the second slot antenna are configured so that current flows along the second rim surface and around a perimeter of the second slot antenna.

6. The wearable ring device of claim 1, wherein the first slot antenna spans a first radial portion of the first rim surface, and wherein the second slot antenna spans a second radial portion of the second rim surface that radially overlaps with the first radial portion of the first rim surface such that current flows around a perimeter of the first slot antenna and such that the second slot antenna interrupts an alternative path orthogonal to the perimeter of the first slot antenna.

7. The wearable ring device of claim 1, wherein the first rim surface comprises an upper rim surface and the second rim surface comprises a lower rim surface opposite the upper rim surface.

8. The wearable ring device of claim 1, wherein the first slot antenna comprises a first non-conductive material and the first rim surface comprises a conductive material, and wherein the second slot antenna comprises a second non-conductive material and the second rim surface comprises the conductive material.

9. The wearable ring device of claim 8, wherein the first non-conductive material, the second non-conductive material, or both, comprises air, epoxy, polymer, ceramic, or plastic.

10. The wearable ring device of claim 1, wherein:

the first slot antenna comprises a first ring of non-conductive material that is concentric with the inner curved surface and the outer curved surface; and the second slot antenna comprises a second ring of non-conductive material that is concentric with the inner curved surface and the outer curved surface.

11. The wearable ring device of claim 1, wherein:

the first slot antenna comprises a first arc of non-conductive material that is concentric with the inner curved surface and the outer curved surface; and the second slot antenna comprises a second arc of non-conductive material that is concentric with the inner curved surface and the outer curved surface.

12. The wearable ring device of claim 1, further comprising:

a communication module within the wearable ring device and coupled, via a first interconnect, with a conductive element that is configured to capacitively couple with the outer curved surface or the inner curved surface, the communication module configured to energize the first slot antenna and the second slot antenna by applying electrical signals to the conductive element via the first interconnect.

13. The wearable ring device of claim 12, wherein the conductive element comprises a conductive plate or a microstrip line.

14. The wearable ring device of claim 12, further comprising:

a circuit board comprising a ground plane that is coupled with the conductive element via a second interconnect.

15. The wearable ring device of claim 1, further comprising:

a communication module within the wearable ring device and coupled with an interior wall of the outer curved surface, the communication module configured to energize the first slot antenna and the second slot antenna by applying electrical signals to the interior wall.

16. The wearable ring device of claim 1, wherein the first slot antenna and the second slot antenna are on a first portion of the wearable ring device, and further comprising:

a battery disposed within a second portion of the wearable ring device that is opposite the first portion; and a set of one or more sensors coupled with the inner curved surface and configured to collect physiological data from the user, the set of one or more sensors disposed within the first portion of the wearable ring device.

17. A wearable ring device, comprising:

an inner curved surface comprising a first conductive material and configured to interface with the skin of a user;

an outer curved surface comprising a second conductive material and opposite the inner curved surface;

a first slot antenna disposed along a first rim surface of the wearable ring device that is between the inner curved surface and the outer curved surface, wherein the first slot antenna spans a first radial portion of the first rim surface; and a second slot antenna disposed along a second rim surface of the wearable ring device that is opposite the first rim surface and that is between the inner curved surface and the outer curved surface, wherein the second slot antenna spans a second radial portion of the second rim surface that radially overlaps with the first radial portion of the first rim surface such that current flows around a perimeter of the first slot antenna and such that the second slot antenna interrupts an alternative path orthogonal to the perimeter of the first slot antenna.

18. The wearable ring device of claim 17, wherein the first slot antenna is configured such that current flows around a perimeter of the second slot antenna.

19. The wearable ring device of claim 17, further comprising:

a communication module within the wearable ring device and coupled with a conductive element that is configured to capacitively couple with the outer curved surface or the inner curved surface, the communication module configured to energize the first slot antenna and the second slot antenna by applying electrical signals to the conductive element.

* * * * *